(12) United States Patent
Lowrimore et al.

(10) Patent No.: US 10,041,702 B2
(45) Date of Patent: Aug. 7, 2018

(54) APPARATUS AND METHOD FOR HYBRID WATER HEATING AND AIR COOLING AND CONTROL THEREOF

(71) Applicant: Rheem Manufacturing Company, Atlanta, CA (US)

(72) Inventors: Walker R. Lowrimore, Alma, AR (US); Robert L. Long, Fort Smith, AR (US); Scott D. Winters, Alma, AR (US); Randy W. Foster, Charleston, AR (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 705 days.

(21) Appl. No.: 14/476,647

(22) Filed: Sep. 3, 2014

(65) Prior Publication Data

US 2016/0061508 A1    Mar. 3, 2016

Related U.S. Application Data

(60) Provisional application No. 62/044,931, filed on Sep. 2, 2014.

(51) Int. Cl.
*F25B 13/00* (2006.01)
*F25B 5/02* (2006.01)
(Continued)

(52) U.S. Cl.
CPC .................. *F25B 5/02* (2013.01); *F24D 3/18* (2013.01); *F24D 5/12* (2013.01); *F24D 12/02* (2013.01); *F24D 15/04* (2013.01); *F24D 17/02* (2013.01); *F24D 19/1006* (2013.01); *F24D 19/1054* (2013.01); *F24D 19/1087* (2013.01);
(Continued)

(58) Field of Classification Search
CPC ................ F25B 5/02; F25B 2700/1933; F25B 2600/2507; F24H 4/02; F24H 6/00
See application file for complete search history.

(56) References Cited

U.S. PATENT DOCUMENTS 4,012,920 A    3/1977  Kirschbaum
4,227,382 A   10/1980  Coyne
(Continued)

FOREIGN PATENT DOCUMENTS

CN    1568417 A    1/2005
CN    1609518      4/2005
(Continued)

OTHER PUBLICATIONS

International Search Report and Written Opinion for PCT/US2015/047860, dated Dec. 11, 2015.
(Continued)

*Primary Examiner* — Larry Furdge
(74) *Attorney, Agent, or Firm* — King & Spalding LLP

(57) ABSTRACT

A system for conditioning air circulated from an interior of a building includes a refrigerant path, an air-cooled condenser in the refrigerant path, a water-cooled condenser in the refrigerant path that transfers heat from refrigerant in the refrigerant path to the building water, an evaporator in the refrigerant path, and a control system. The control system moves the system between operation of the air-cooled condenser and the water-cooled condenser based upon predetermined system conditions.

21 Claims, 10 Drawing Sheets

(51) Int. Cl.
| | |
|---|---|
| *F25B 6/02* | (2006.01) |
| *F25B 6/04* | (2006.01) |
| *F25B 29/00* | (2006.01) |
| *F25B 41/04* | (2006.01) |
| *F25B 49/02* | (2006.01) |
| *F25B 6/00* | (2006.01) |
| *F24H 4/02* | (2006.01) |
| *F24H 4/06* | (2006.01) |
| *F24H 6/00* | (2006.01) |
| *F24H 9/20* | (2006.01) |
| *F24D 3/18* | (2006.01) |
| *F24D 5/12* | (2006.01) |
| *F24D 12/02* | (2006.01) |
| *F24D 15/04* | (2006.01) |
| *F24D 17/02* | (2006.01) |
| *F24D 19/10* | (2006.01) |
| *F24F 1/00* | (2011.01) |
| *F25B 49/00* | (2006.01) |

(52) U.S. Cl.
CPC ............... *F24F 1/00* (2013.01); *F24H 4/02* (2013.01); *F24H 4/06* (2013.01); *F24H 6/00* (2013.01); *F24H 9/20* (2013.01); *F24H 9/2007* (2013.01); *F24H 9/2064* (2013.01); *F25B 6/00* (2013.01); *F25B 6/02* (2013.01); *F25B 6/04* (2013.01); *F25B 29/003* (2013.01); *F25B 41/04* (2013.01); *F25B 49/02* (2013.01); *F25B 49/027* (2013.01); *F24D 2200/12* (2013.01); *F24D 2200/126* (2013.01); *F24D 2200/31* (2013.01); *F24D 2220/042* (2013.01); *F24D 2220/046* (2013.01); *F25B 49/005* (2013.01); *F25B 2339/047* (2013.01); *F25B 2400/01* (2013.01); *F25B 2500/31* (2013.01); *F25B 2600/25* (2013.01); *F25B 2600/2507* (2013.01); *F25B 2700/19* (2013.01); *F25B 2700/195* (2013.01); *F25B 2700/1933* (2013.01); *F25B 2700/2106* (2013.01); *F25B 2700/21161* (2013.01); *Y02B 10/70* (2013.01); *Y02B 30/12* (2013.01); *Y02B 30/14* (2013.01); *Y02B 30/52* (2013.01)

(56) References Cited

U.S. PATENT DOCUMENTS

| | | | |
|---|---|---|---|
| 4,238,933 A | 12/1980 | Coombs | |
| 4,241,588 A | 12/1980 | Murphy et al. | |
| 4,281,519 A | 8/1981 | Spath et al. | |
| 4,386,500 A | 6/1983 | Sigafoose | |
| 4,391,104 A | 7/1983 | Wendschlag | |
| 4,449,375 A | 5/1984 | Briccetti | |
| 4,575,001 A | 3/1986 | Oskarsson et al. | |
| 4,645,908 A | 2/1987 | Jones | |
| 4,693,089 A | 9/1987 | Bourne et al. | |
| 5,003,788 A | 4/1991 | Fischer | |
| 5,050,394 A | 9/1991 | Dudley et al. | |
| 5,081,846 A | 1/1992 | Dudley et al. | |
| 5,105,633 A | 4/1992 | Briggs | |
| 5,269,153 A | 12/1993 | Cawley | |
| 5,495,723 A | 3/1996 | MacDonald | |
| 5,526,649 A | 6/1996 | Sada | |
| 5,575,159 A | 11/1996 | Dittell | |
| 5,628,200 A | 5/1997 | Pendergrass | |
| 5,755,111 A | 5/1998 | Toyama | |
| 5,906,104 A | 5/1999 | Schwartz et al. | |
| 6,357,245 B1 | 3/2002 | Weng et al. | |
| 7,040,108 B1 | 5/2006 | Flammang | |
| 7,155,922 B2 | 1/2007 | Harmon et al. | |
| 7,721,560 B2 | 5/2010 | Carpenter | |
| 8,037,931 B2 | 10/2011 | Penev et al. | |
| 8,356,481 B2 | 1/2013 | Penev | |
| 2002/0092311 A1 | 7/2002 | James | |
| 2004/0144528 A1 | 7/2004 | Kunimoto et al. | |
| 2004/0177628 A1 | 9/2004 | Kurata et al. | |
| 2005/0109490 A1 | 5/2005 | Harmon et al. | |
| 2005/0183432 A1 | 8/2005 | Cowans et al. | |
| 2006/0042285 A1 | 3/2006 | Heberle et al. | |
| 2006/0064995 A1 | 3/2006 | Rigal et al. | |
| 2006/0179874 A1 | 8/2006 | Barger | |
| 2006/0191495 A1 | 8/2006 | Sun | |
| 2007/0068178 A1* | 3/2007 | Honma | F25B 9/008 62/160 |
| 2008/0236185 A1 | 10/2008 | Choi et al. | |
| 2008/0245087 A1 | 10/2008 | Mutt | |
| 2009/0026281 A1 | 1/2009 | McGreevy | |
| 2009/0049857 A1 | 2/2009 | Murakami et al. | |
| 2009/0120110 A1* | 5/2009 | Grabon | F24D 17/02 62/115 |
| 2009/0248212 A1 | 10/2009 | Cowans et al. | |
| 2010/0000709 A1 | 1/2010 | Chang | |
| 2010/0083950 A1 | 4/2010 | Bloxam | |
| 2010/0209084 A1 | 8/2010 | Nelson et al. | |
| 2011/0120168 A1 | 5/2011 | Choi et al. | |
| 2011/0259025 A1 | 10/2011 | Noh et al. | |
| 2012/0060521 A1 | 3/2012 | Roetker et al. | |
| 2012/0102991 A1* | 5/2012 | Lee | F25B 7/00 62/160 |
| 2012/0312045 A1 | 12/2012 | Kim | |
| 2013/0104574 A1* | 5/2013 | Dempsey | F25B 29/003 62/79 |
| 2014/0230477 A1 | 8/2014 | Furui et al. | |
| 2014/0260358 A1 | 9/2014 | Leete et al. | |
| 2014/0260392 A1 | 9/2014 | Hawkins et al. | |

FOREIGN PATENT DOCUMENTS

| | | |
|---|---|---|
| CN | 200972229 | 11/2007 |
| CN | 101614451 | 12/2009 |
| DE | 10058273 A1 | 5/2002 |
| EP | 0138568 | 4/1985 |
| EP | 0151493 | 8/1985 |
| EP | 0240441 | 10/1987 |
| EP | 2103884 A1 | 9/2009 |
| EP | 2360439 | 8/2011 |
| EP | 2489972 | 8/2012 |
| EP | 2538145 | 12/2012 |
| JP | H11270920 A | 10/1990 |
| JP | 2011094931 | 5/2011 |
| WO | 9002300 A1 | 3/1990 |
| WO | 2003036178 | 5/2003 |
| WO | 2006039580 | 4/2006 |
| WO | 2006128263 | 12/2006 |
| WO | 2006128264 | 12/2006 |
| WO | 2007146050 | 12/2007 |
| WO | WO 2010093516 | 8/2010 |
| WO | WO 2012041225 | 4/2012 |
| WO | 2013061473 | 5/2013 |

OTHER PUBLICATIONS

Rheem, "Integrated Air & Water System" Form No. S11-945, Jan. 2012, 60 pages.
Extended European Search Report for EP Application No. 14773958.5 dated Apr. 10, 2017.
First Office Action dated Jan. 17, 2017 for Chinese Application No. 201480024058.8.
Second Examination Report dated Mar. 17, 2017 for Australian Application No. 2014243719.
Examiner's Requisition dated Jun. 28, 2017 for Canadian Application No. 2,906,662.
Canadian Office Action dated Aug. 23, 2016, for corresponding Application No. 2,906,662.
Pre-Examination Processing Notice (detailed) dated Feb. 15, 2016 for Australian Application No. 2014243719.

(56) References Cited

OTHER PUBLICATIONS

International Search Report and Written Opinion for corresponding PCT application No. PCT/US2014/026894, dated Jul. 15, 2014.

\* cited by examiner

US 10,041,702 B2

APPARATUS AND METHOD FOR HYBRID WATER HEATING AND AIR COOLING AND CONTROL THEREOF

The present application claims priority to U.S. provisional patent application Ser. No. 62/044,931, filed Sep. 2, 2014, entitled APPARATUS AND METHOD FOR HYBRID WATER HEATING AND AIR COOLING AND CONTROL THEREOF, the entire disclosure of which is hereby incorporated by reference herein.

BACKGROUND OF THE PRESENT INVENTION

Various apparatus and methods have been previously proposed for pre-heating water in a water heater or water storage tank using refrigerant from air conditioning apparatus such as an air conditioner with a non-reversible refrigerant circuit, a heat pump for a residential air conditioning system having a reversible refrigerant circuit, and a roof top unit (RTU) commercial system that operates in an air-cooling only mode but that has a valve to alternatively direct refrigerant flow from a compressor either to an air-cooled condenser or to a water-cooled condenser/heat exchanger that exchanges heat from refrigerant used in providing cooled air to a commercial building's interior to water from the commercial building's water heating system.

SUMMARY OF THE INVENTION

The present invention recognizes and addresses various drawbacks of prior art constructions and methods.

In one embodiment, a system for conditioning air and for heating water includes a refrigerant path. A first condenser in the refrigerant path is disposed in an air flow path so that the first condenser transfers heat to air in the air flow path from refrigerant moving through the first condenser in the refrigerant path. A second condenser in the refrigerant path defines a water flow path so that the second condenser transfers heat to water in the water flow path from refrigerant moving through the second condenser in the refrigerant path. The system includes an output line in the refrigerant path from the first condenser to an evaporator and a control system in operative communication with the refrigerant path. The control system is configured to selectively direct refrigerant flow through the first condenser or the second condenser and, upon directing refrigerant flow through the second condenser without directing refrigerant flow through the first condenser, draining refrigerant from the first condenser in response to pressure in the first condenser or the output line.

In another embodiment, a system for conditioning air and for heating water includes a refrigerant path. A first condenser in the refrigerant path is disposed in a first air flow path so that the first condenser transfers heat to air in the first air flow path from refrigerant moving through the first condenser in the refrigerant path. A second condenser in the refrigerant path defines a water flow path so that the second condenser transfers heat to water in the water flow path from refrigerant moving through the second condenser in the refrigerant path. An evaporator in the refrigerant path is disposed in a second air flow path so that air in the second air flow path transfers heat to refrigerant moving through the evaporator. A compressor in the refrigerant path is configured to move refrigerant in the refrigerant path. The system includes an output line in the refrigerant path from the first condenser to the evaporator via an expansion valve and a control system in operative communication with the refrigerant path. The control system is configured to selectively direct refrigerant flow from the compressor to the first condenser or the second condenser and, upon directing refrigerant flow to the second condenser without directing refrigerant flow to the first condenser, drain refrigerant from the first condenser into a flow between the second condenser and the evaporator in response to pressure in the first condenser or the output line.

In a still further embodiment, a system for conditioning air and for heating water includes a refrigerant path. A first condenser in the refrigerant path is disposed in a first air flow path so that the first condenser transfers heat to air in the first air flow path from refrigerant moving through the first condenser in the refrigerant path. A second condenser in the refrigerant path defines a water flow path so that the second condenser transfers heat for water in the water flow path from refrigerant moving through the second condenser in the refrigerant path. An evaporator in the refrigerant path is disposed in a second air flow path so that air in the second air flow path transfers heat to refrigerant moving through the evaporator. A compressor in the refrigerant path is configured to move refrigerant in the refrigerant path. The system includes an output line in the refrigerant path from the first condenser to the evaporator via an expansion valve, a refrigerant drain line from the output line to the evaporator downstream from the expansion valve with respect to the refrigerant path, a sensor disposed with respect to the output line so that the sensor outputs a signal corresponding to pressure in the output line, and a control system in operative communication with the sensor and the drain line to selectively open and close the drain line. The control system is configured to control opening of the drain line responsively to the signal.

Other objects, features, and aspects of the present invention may be achieved by various combinations and subcombinations of the disclosed elements, which are discussed in greater detail below.

BRIEF DESCRIPTION OF THE DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which.

Figure 1:
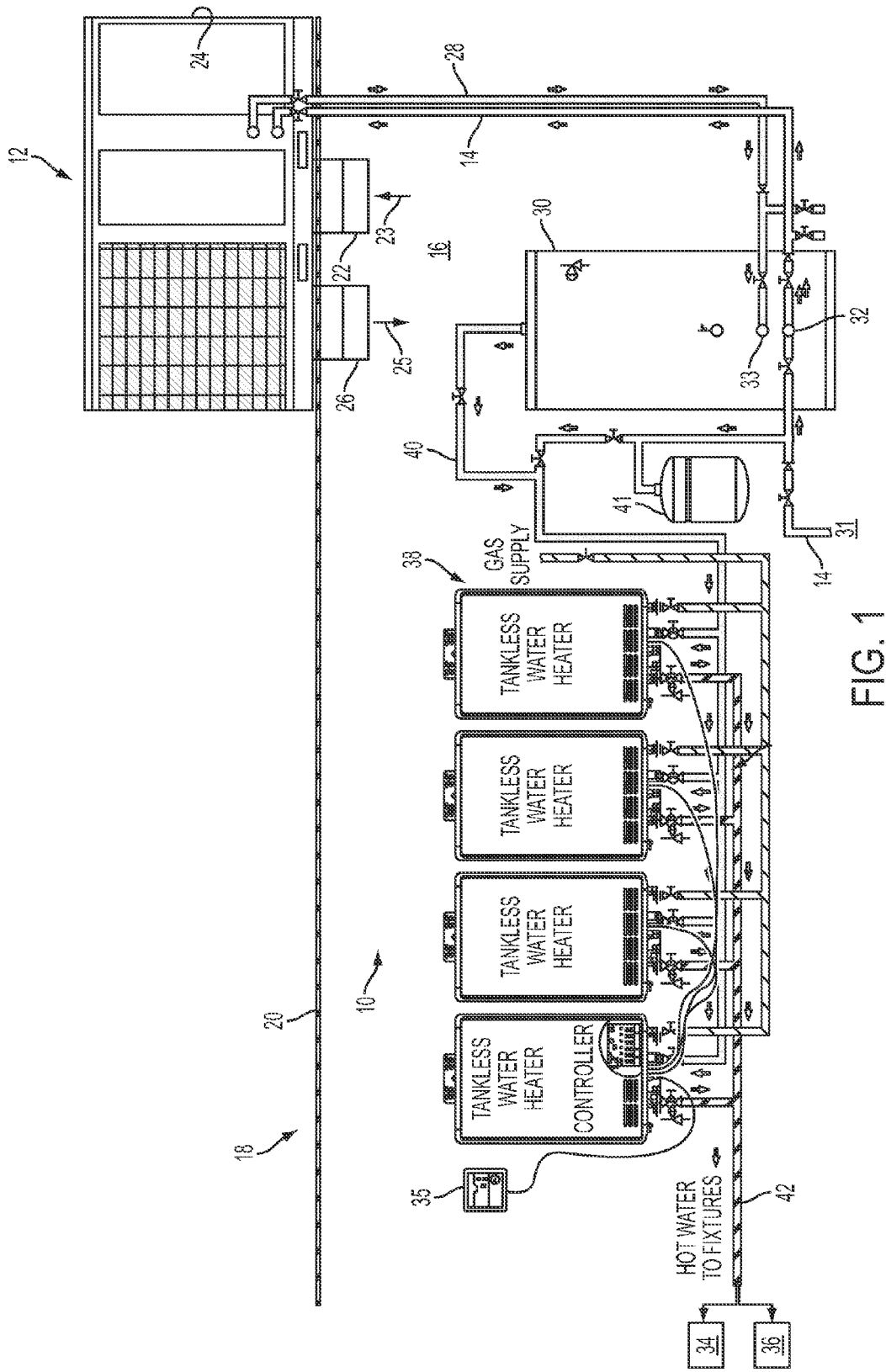
FIG. 1 is a schematic illustration of a building having a water storage, heating and utilization system, an interior space, and an air conditioning system in communication with the interior space to deliver conditioned air thereto, in accordance with an embodiment of the present invention.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "air conditioning" apparatus, system, etc. encompass apparatus useable to change the temperature of air being delivered to a conditioned space and having an associated refrigerant circuit. Thus, an "air conditioning" apparatus or system may comprise, without limitation, (1) an air conditioning unit (or "air conditioner") having a non-reversible refrigerant circuit that may be used to cool air delivered to a conditioned space, or (2) a heat pump having a reversible refrigerant circuit that may be used to heat or cool air delivered to a conditioned space.

Moreover, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Air conditioning systems capture heat at some point in the refrigerant's continuous cycle and transfer the heat to or remove heat from a structure, depending upon whether the system is functioning in a cooling mode or, if capable of dual modes, in a heating mode. In carrying out principles of one or more embodiments of the present invention, a portion of that heat may be captured and used to heat water for delivery to end uses in a structure, such as a building for which the system also provides conditioned air. In certain embodiments, the air conditioning system may provide heated water to a preliminary stage of the building's water heating system, at a temperature at or below a high set point temperature utilized by the water heater in maintaining water temperature. One or more electric elements or gas burners in the water heating system may provide additional heat to bring the water temperature up to the overall system's high set point temperature.

An air conditioning/water heater system 10 embodying principles of one or more embodiments of the present invention is schematically depicted in FIG. 1 and includes an air conditioning system 12 that, in the presently described embodiments, is a rooftop mounted-type air conditioning system that may be used, for example, to condition air in an interior space 16 of a structure 18 such as a commercial building. Air conditioning system 12 is disposed on a roof 20 of building 18 and has a duct 22 that extends from a main housing 24 of system 12 through roof 20 and into interior space 16. A fan 21 (FIG. 6) within housing 24 draws air 23 through duct 22 from space 16 to an evaporator coil 54 (FIGS. 2-6) that is disposed within housing 24 and that transfers heat from the warm air 23 from interior space 16 to refrigerant in the system's refrigerant circuit, thereby cooling the air that the air conditioning system then returns (as indicated at 25) to interior space 16 through a second duct 26 extending from housing 24 through roof 20. As described in more detail below, system 12 later cools the refrigerant at an air-cooled condenser coil 46 (FIGS. 2-6), where the refrigerant transfers heat to ambient air 27 (FIG. 6) drawn over the condenser coil by a second fan 29 (FIG. 6).

At certain times at which system 10 requires heated water, air conditioning system 12 switches the refrigerant-cooling function from the air-cooled condenser to a heat exchanger coil 50 (FIGS. 2-6) that receives water from a water storage tank 30 within a water-heating system 38 of building 18, so that the refrigerant transfers heat to the water rather than to ambient air 27. Thus, heat exchanger 50 may be considered a water-cooled condenser. Tank 30 initially receives cold (e.g. ground temperature) water from a cold water pipe 14 via a fitting 32 from a cold water source 31. Fitting 32 is a "T" fitting that allows cold water flow based on pressure differences. When pump 52 is inactive, and when water is drawn from storage tank 30, cold water flows into tank 30 from source 31. When pump 52 is active, and when there is no cold water call from source 31, water from storage tank 30 flows through fitting 32 to pump 52 via pipe 14. When there is a cold water call, pump 52 may draw all cold water from source 31 or a combination of cold water from source 31 and water from tank 30 through pipe 14.

Upon its activation, pump 52 draws the initially-cold water up from tank 30 and/or source 31 via fitting 32 and directs the water to water-cooled condenser 50. After transferring refrigerant heat to the water, system 12 outputs the now-warmed water from the heat exchanger through a second pipe 28 that delivers the warmed water to water storage tank 30 via a fitting 33. As described in more detail below, this cycle, of drawing water up from tank 30 to water-cooled condenser 50, contributing heat to the water, and returning the water to tank 30, repeats, thereby increasing the temperature of the tank's water toward a target temperature. Although the construction of tank 30 may vary, in this example tank 30 may be a 115 gallon capacity porcelain enamel-lined tank having two inch rigid foam insulation and a baked enamel steel jacket, provided under the model name STA 120 by Rheem Manufacturing, Inc., of Atlanta, Ga.

When a ware washer 34, faucets 36, or other fixtures or devices of building 18 require hot water from one or more tankless water heater stages of water heating system 38, a water heating system control circuit 35 controls relays (not shown) that open respective valves that allow the pre-heated water from tank 30 to flow into respective tankless water heating stages of system 38, over pipe 40. As should be understood, the illustrated valves between expansion tank 41 and pipe 40 are normally closed. Tankless water heating system 38 heats the water to a final threshold temperature, for example 140° F. or 185° F., and outputs the final heated water to hot water lines 42 that direct heated water to building 18, for example the ware washer or faucets. As water heating stages 38 draw water from tank 30, cold water source 31 replenishes tank 30. This lowers the temperature of water in tank 30, but the heating function of water-cooled condenser 50 continues to warm the tank water as the above-described cycle repeats. As indicated in FIG. 1, fitting 32 is disposed near the bottom of tank 30. As cooler water in the tank is generally closer to the tank bottom, this allows system 12 to contribute heat to the coolest water in the tank. As should be understood, an expansion tank 41 may be provided in the system to receive water from the tank as it heats, and therefore expands, in its normal operation without tripping the system's pressure relief valves.

FIGS. 2-6 schematically illustrate embodiments of an air conditioning system 12 embodying one or more principles of the present invention. As noted above, system 12 includes an air-cooled condensing coil 46, a compressor (i.e., a pump) 48, and an evaporator coil 54. With the additional use of a plate-type heat exchanger (water-cooled condenser) 50 and water pump 52, system 12 is arranged to operate in an air cooling mode while providing supplemental, refrigerant-based heat to water stored in water tank 30 (FIG. 1). A schematically depicted electronic control system 56 (shown only in FIG. 2, but present in the systems of FIGS. 1-6) controls the various functions of air conditioning/water pre-heating system 12 and operates various subsequently described components thereof.

As should be understood, an air conditioning system may comprise, from the standpoint of refrigerant flow, a closed loop of refrigerant flowing among the compressor, the condenser, and the evaporator. In so-called split systems, the evaporator is typically disposed inside an enclosure that receives the conditioned air from the conditioned space (e.g., a building interior space such as space 16, shown in FIG. 1), such as within an air handler that draws recirculating interior air across the evaporator. Because the evaporator is associated with the indoor air, it is often referenced as an "indoor" coil, even though, as in the presently-described embodiments, its physical location may be either within or outside the building that the system services. The condenser coil is generally disposed outside the structure of the conditioned space, where a fan draws ambient environment air across the condenser coil to remove heat from the refrigerant. In the outdoor, roof-mounted system shown in the present figures, both coils are disposed outside the conditioned space, but air from inside the space is directed, for example through one or more ducts such as ducts 22 and 26 shown in FIG. 1, from the interior space to the evaporator coil, and then back into space 16. Regardless of physical location, however, the evaporator contributes heat to the refrigerant while the condenser outputs heat acquired from the refrigerant.

As will be understood, the refrigerant acquires heat in part from the indoor air at the evaporator as the liquid refrigerant evaporates in response to the influence of an expansion valve at the evaporator coil's input. As the system's air handler fan moves the building's recirculating air over the evaporator coils, a change in the refrigerant's phase from liquid to gas removes energy (i.e. heat) from the indoor air, thereby cooling the air as it is forced back into the building's conditioned space. The warm refrigerant gas then flows from the evaporator coil to the compressor, which receives the gas and pumps it back to the condenser, adding pressure and heat. The condenser cools the refrigerant, thereby dissipating the refrigerant's acquired heat (from the evaporator and the compressor) to the ambient environment via the airflow that the fan moves over the coil, and the cooled refrigerant flows back to the evaporator. That is, refrigerant flows from the compressor, to the condenser, to the evaporator, and back to the compressor.

As the condenser cools the refrigerant, the refrigerant's phase changes from vapor to liquid, and its pressure lowers due to friction within the heat exchanger. However, the refrigerant flow path length and tubing dimensions, and the compressor's size and strength, are selected so that sufficient positive and negative pressure remain at the condenser's output and input to maintain refrigerant flow to the evaporator and therefrom back to the compressor. The selection of such system components and operating parameters to enable desired heat transfer and recirculating refrigerant flow through the flow circuit should be understood in this art. While it should be understood that the air conditioning systems described below are designed to provide sufficient heat transfer and pressure to maintain system operation, these variables are not discussed further herein.

One or more embodiments described herein inserts into the refrigerant path the plate-type heat exchanger 50 that receives water from, or water that is otherwise intended for, water heating system storage tank 30 so that the heat exchanger transfers heat from the refrigerant to the tank water. In the system's operation, the water-cooled heat exchanger replaces air-cooled condenser 46 in the air conditioning system's underlying compressor-condenser-evaporator-compressor sequence, but it should be understood that partial diversion of refrigerant to the water cooled heat exchanger is within the scope of the present disclosure. Thus, while the present disclosure primarily provides examples having an air-cooled condenser and a water-cooled condenser entirely in the alternative to each other, it should be understood that other arrangements fall within the present disclosure.

Further, although the presently-described embodiments are discussed in the context of a roof-type air conditioning system, in which the condensers and the evaporator are located in the same housing, it should be understood that the present disclosure encompasses other air conditioning systems, for example where the air-cooled condenser is disposed outside the building or inside the building (with exterior ambient air being delivered to the condenser), and where each of the water-cooled condenser and the evaporator are either inside or outside the building.

Control system 56 may comprise a programmable logic controller (PLC) or other computer that operates as a general system controller for system 12. Housed, for example, within housing 24 (FIG. 1) of system 12, the PLC communicates with and controls (through suitable electrical wired or wireless connections, relays, power sources, and other electromechanical connections, as should be understood in this art) the actuation and operation of the components described herein, including but not limited to the compressor(s), air-cooled condenser fan, evaporator fan, water pump, three way valve and all other electrically controlled valves and relays. As such, the control system communicates with and controls the operative components of air conditioning system 12, including the valve system within the refrigerant flow path that, in conjunction with the compressor(s) (also controlled by the control system), control refrigerant flow. The reference to connections between control system 56 and each of the components of air conditioning system 12, tank 30 (FIG. 1) and water heating system 38 (FIG. 1) encompass such communications and control. Such communication may also encompass communication between the control system and a temperature sensor ambient to system 12 that provides a signal to the control system corresponding to temperature of the environment ambient to system 12. Furthermore, control system 56 receives input signals from one or more thermostats in the building's conditioned space that provide instructions (i.e. cooling calls) regarding whether to activate the air conditioning system to an air cooling mode of operation, deactivate the air conditioning system from an air cooling mode, and actuate the air handler. The thermostat(s), each being located in the conditioned space and including a temperature sensor, may also output to the control system a signal corresponding to temperature of the conditioned space 16 (FIG. 1). The operation of thermostats in generating such instructions should be well understood and is, therefore, not discussed further herein. The thermostat(s) may be considered a part of control system 56, and, in any event, the control system can share or perform functions typically performed by the thermostat(s). Accordingly, reference herein to the various functions performed by control system 56 may encompass communications between the control system and the thermostat(s), as well as communications between the control system and the system 12 compressor, condenser and evaporator fans, water pump, valves and sensors, and between the control system and the water heating system. The control system activates and deactivates the system 12 components based on the air conditioning system programming in response to signals from the thermostat(s), as should be understood, and optionally signals from sensors of system 12 and/or the water heating system that indicate system operating parameters, as described herein. As discussed herein, actuation of the air conditioning system may refer to activation of the compressor to move refrigerant through the refrigerant path, activation of the condenser fan, and activation of the evaporator fan, in certain embodiments.

It will be understood from the present disclosure that the functions ascribed to control system 56 may be embodied by computer-executable instructions of a program that executes on one or more PLCs or other computers that operate(s) as the general system controller for system 12. Generally, program modules include routines, programs, components, data structures, etc., that perform particular tasks and/or implement particular abstract data types. Moreover, those skilled in the art will appreciate that the systems/methods described herein may be practiced with various controller configurations, including programmable logic controllers, simple logic circuits, single-processor or multi-processor systems, as well as personal computers, hand-held computing devices, microprocessor-based or programmable consumer or industrial electronics, and the like. Aspects of these functions may also be practiced in distributed computing environments, for example in so-called "smart" arrangements and systems, where tasks are performed by remote processing devices that are linked through a local or wide area communications network to the components otherwise illustrated in the Figures. In a distributed computing environment, programming modules may be located in both local and remote memory storage devices. Thus, control system 56 may comprise a computing device that communicates with the system components described herein via hard wire or wireless local or remote networks.

A controller that could effect the functions described herein could include a processing unit, a system memory and a system bus. The system bus couples the system components including, but not limited to, system memory to the processing unit. The processing unit can be any of various available programmable devices, including microprocessors, and it is to be appreciated that dual microprocessors, multi-core and other multi processor architectures can be employed as the processing unit.

Software applications may act as an intermediary between users and/or other computers and the basic computer resources of electronic control system 56, as described, in suitable operating environments. Such software applications include one or both of system and application software. System software can include an operating system that acts to control and allocate resources of control system 56. Application software takes advantage of the management of resources by system software through the program models and data stored on system memory.

Control system 56 may also, but does not necessarily, include one or more interface components that are communicatively coupled through the bus and facilitate interaction with the control system. By way of example, the interface component can be a port (e.g., serial, parallel, PCMCIA, USC, or FireWire) or an interface card, or the like. The interface component can receive input and provide output (wired or wirelessly). For instance input can be received from devices including but not limited to a pointing device such as a mouse, track ball, stylus, touch pad, key pad, touch screen display, keyboard, microphone, joy stick, gamepad, satellite dish, scanner, camera, or other component. Output can also be supplied by control system 56 to output devices via the interface component. Output devices can include displays (for example cathode ray tubes, liquid crystal display, light emitting diodes, or plasma) whether touch screen or otherwise, speakers, printers, and other components. In particular, by such means, control system 56 receives inputs from, and directs outputs to, the various components with which control system 56 communicates, as described herein.

In general, the control system receives signals from the thermostat(s) of building 18 (directly or indirectly, e.g. via water system control circuit 35), components of air conditioning system 12, and optionally temperature sensors or other operating parameter sensors that are not part of the thermostat(s) or system 12. The control system activates or deactivates the air conditioning system to provide or stop the provision of conditioned air to a conditioned space 16 in response to the thermostat signals. It decides whether to transition system 12 to a water heating mode of operation in response to the conditions as described herein, and it decides when to return to an air-cooling/air-cooled condensing only mode or to deactivate system 12 altogether. The apparatus for carrying out these functions, and the manner of their operation, are described below.

Still referring to FIGS. 1-6, air conditioning system 12 includes a refrigerant circuit 58 having refrigerant line portions 60 and 62 that operatively couple condenser coil 46, compressor 48, evaporator coil 54, and heat exchanger (water-cooled condenser) 50. Refrigerant circuit 58 also includes a low ambient control sensor 64, a refrigerant liquid line pressure sensor 66, a heat exchanger refrigerant drain line solenoid valve 68, an air-cooled condenser refrigerant drain line solenoid valve 70, pump 52, a water pressure sensor 72, a three-way valve 74, a high-pressure switch 76, compressor 48, an inlet water temperature sensor 152 (FIG. 3), an outlet water temperature sensor 150 (FIG. 3), a low pressure sensor 78, and a refrigerant low pressure switch 80 (low pressure switch 80 is redundant to sensor 78 and may be omitted in other embodiments; its operation is reflected by the discussion of sensor 78 herein), all operatively linked to control system 56 except, in the case of binary switches, when a switch is directly connected to its controlled device. Fans 21 and 29 are also linked to, and controlled by, control system 56. Control system 56 controls three way valve 74 to selectively direct refrigerant from the compressor to the air-cooled condenser or the water-cooled condenser.

Sensor 64 is a pressure sensor that control system 56 monitors to detect low ambient temperature conditions. If system 12 is left in an operative condition in the presence of a low ambient temperature, a risk arises that water vapor in the ambient air freezes on the evaporator coils. As such a condition can be identified by a low pressure at the evaporator input, control system 56 deactivates system 12, and the control system detects a pressure from sensor 64 below a predetermined threshold. The operation of air-conditioning systems to prevent coil freezing should be well understood and is therefore not discussed further herein.

Figure 2:
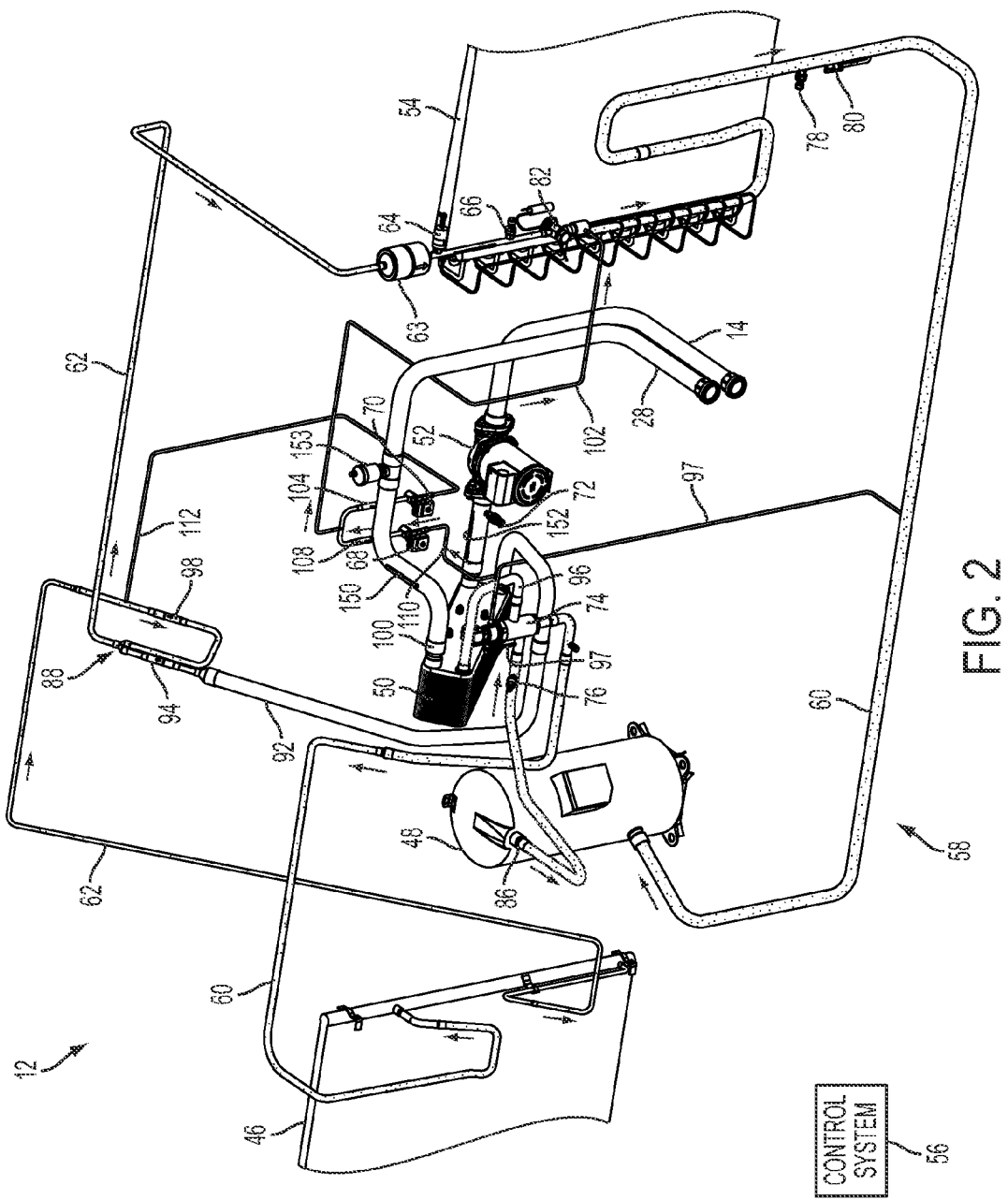
FIG. 2 is a schematic illustration of an embodiment of the air conditioning system illustrated in FIG. 1.
Figure 3:
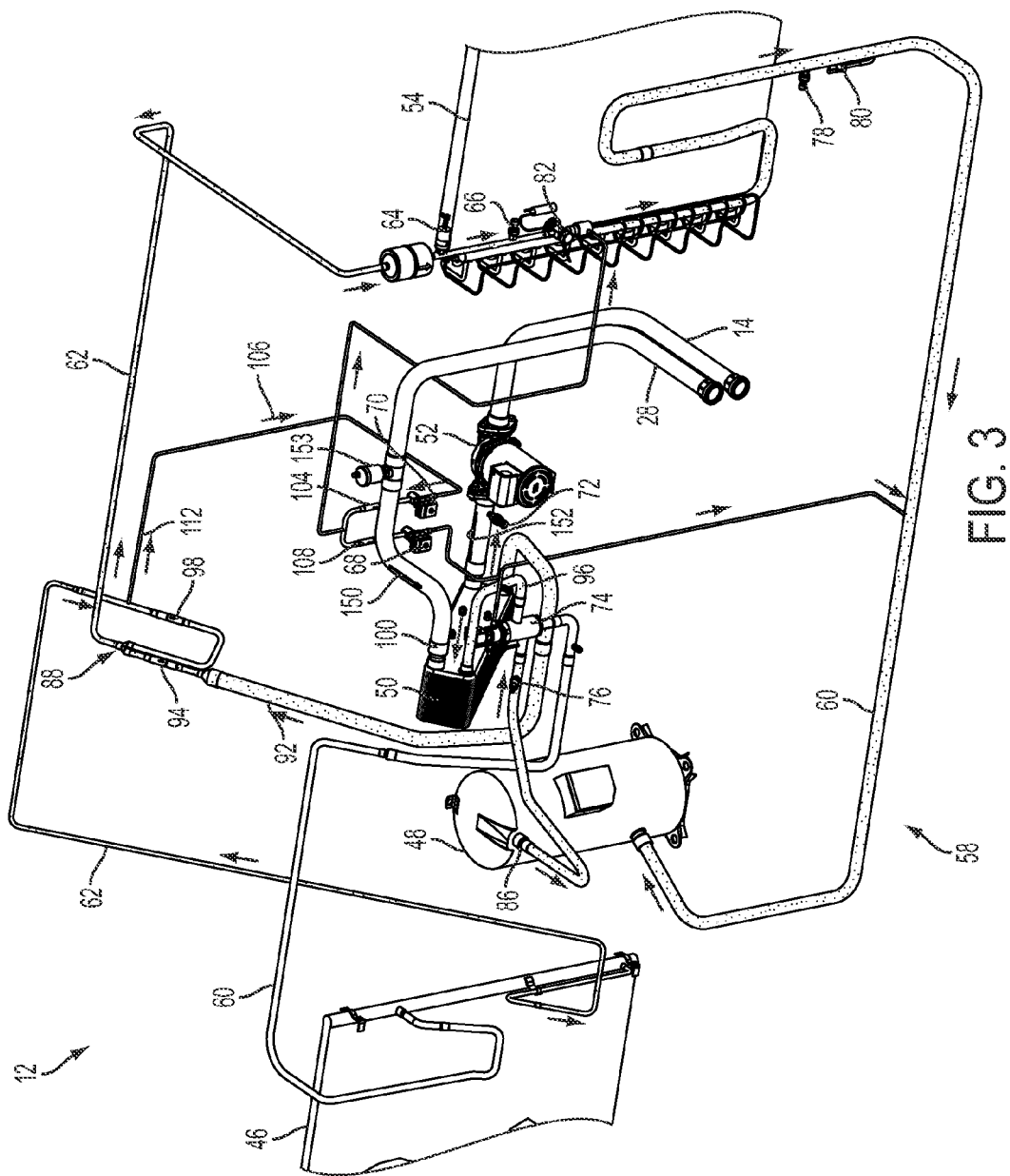
FIG. 3 is a schematic illustration of the air conditioning system illustrated in FIG. 2.

As illustrated in FIG. 2, water to be heated flows into heat exchanger 50 via water inlet pipe 14, as driven by pump 52, and exits heat exchanger 50 to tank 30 via outlet pipe 28.

An expansion valve 82 is disposed in refrigerant line portion 62 at an inlet to evaporator coil 54. As explained above, an expansion valve receives a fluid refrigerant input at a high pressure and, depending on the settings within the valve, outputs the fluid at a lower pressure. This allows pressurized refrigerant in evaporator 54 to drop in pressure in the coil and change phase from a liquid to a gas.

In the embodiment illustrated in FIGS. 2-5, system 12 includes a single refrigerant circuit, or stage, 58. In other embodiments, however, system 12 includes two or more refrigerant stages. Commercial air conditioning systems, for example, can be used to provide conditioned air to relatively large interior areas 16 and/or interior areas in which heat generating equipment is operated that can add significant amounts of heat to the conditioned space in a short period of time, thereby causing large differences between the interior area's actual temperature and the air conditioning system's set point (i.e. desired) temperature. In other words, the load that the air conditioning system may be called upon to handle (e.g. the amount of heat that the air conditioning system may be called upon to remove from the conditioned space, as defined by the difference between actual and set point temperatures for a given air volume) may vary within a wide range during the system's normal use. Regardless of load level, it is desirable that the air conditioning system bring the conditioned space toward the set point quickly, thereby maintaining the conditioned space at a generally consistent temperature. Accordingly, the system selectively engages and disengages additional refrigerant stage(s) correspondingly to the load, adding stage(s) as the load increases and removing stage(s) as the load decreases. The thermostat system of building 18 determines the need for conditioned air in the conditioned space, thereby providing control system 56 with a measure of the load, and control system 56 controls the air conditioning system so that it operates a number of stages appropriate for a given load at a given time. The construction and operation of thermostat/control systems for control of multi-stage air conditioning systems should be understood in this art and is, therefore, not discussed in further detail herein.

As will also be understood, a given refrigerant flow path 58 has a finite capacity to remove heat from the recirculating air, as defined by the type of refrigerant, the volume of refrigerant in the refrigerant circuit, and the speed with which the refrigerant can be circulated through the circuit while effectively receiving heat from the recirculating air. As noted above, the refrigerant circuit's particular capacity design is not, in and of itself, part of the present invention, but as noted, a refrigerant circuit will have a heat removal capacity. A given circuit may be designed that can effectively remove heat from a given building's interior area over its normal load variation at a desired or acceptable rate, and systems having only a single circuit, or stage, are within the scope of the present disclosure. As will also be understood, however, the cost of operating a refrigerant circuit varies directly with the refrigerant circuit's capacity, e.g. due to the size of the compressor needed to operate the circuit and the work performed by that compressor in operating the circuit. Accordingly, it is known to construct air conditioning systems with multiple distinct, standard-capacity refrigerant circuits, so that a given air conditioning system may be constructed with a particular number of stages to accommodate the building's particular heat load variation that the air conditioning system is expected to service. As a building's heat load rises and falls, individual refrigerant stages may be activated and deactivated. The air conditioning system can selectively activate and deactivate individual refrigerant stages to adjust the level of compressor operation (and, therefore, cost) to meet, but not excessively exceed, the capacity needed to handle the required heat load. Such an arrangement not only permits efficiency of construction, in that air conditioning systems can be configured using standard equipment rather than requiring specially-designed components on a case by case basis, but also increases efficiency of operation over single stage systems where building heat loads vary significantly.

FIG. 6 schematically illustrates a multi-stage air conditioning system 12. Although FIG. 6 illustrates a two stage system, it will be understood that this is for purposes of example only and that system 12 may include more than two stages. In this example, a first refrigerant circuit 58a defines a first stage, encompassing air-cooled condenser 46, compressor 48, and evaporator 54. A second refrigerant circuit 58b also passes through air-cooled compressor 46 and evaporator 54, but includes a compressor 154 that is distinct from the first stage's compressor 48. Refrigerant circuits 58a and 58b share condenser 46 and evaporator 54 for purposes of mechanical convenience, but the refrigerant circuits remain separate from each other, with no refrigerant intermingling between them. That is, in each of condenser 46 and evaporator 54, the two refrigerant paths form two distinct sets of coils within the overall coil structure. A single fan 29 moves air 27 over both refrigerant circuits 58a and 58b in air-cooled condenser 46, and a single fan 21 moves air 23 over both refrigerant circuits 58a and 58b in evaporator 54. While FIG. 6 illustrates a single fan 29 and a single fan 21, it will be understood that multiple fans can be used, e.g. to allow the use of smaller, less expensive fans to create a single air flow that would otherwise require a disproportionately more expensive single fan, but because the fan(s) create a single air flow, single fan representations are illustrated in FIG. 6 and are discussed herein for ease of explanation. Being located proximate each other in the same condenser/evaporator structures, i.e. in parallel with each other from the perspective of the air flows, each of air flows 27 and 23 simultaneously passes over both circuits in the respective condenser/evaporator, allowing more effective heat transfer than arrangements in which the coil sets are arranged sequentially. It should be understood, however, that sequential respective air-cooled condensers, and/or sequential respective evaporators, for the multiple refrigerant stages are encompassed within the present disclosure.

Accordingly, refrigerant circuit 58b includes a refrigerant line 156 that carries refrigerant from air-cooled condenser 46 through an expansion valve 158 to evaporator 54, under the force of compressor 154. Compressor 154 pulls the heated gas refrigerant from evaporator 54 to the compressor over a refrigerant line 157, and then back to air-cooled condenser 46, in a circulation pattern as described above. The water-cooled condenser 50 is utilized in the refrigerant stage defined by refrigerant path 58a. Although refrigerant path 58b does not include a water heating component circuit, it should be understood that the system can be configured to operate multiple water heating circuits in respective refrigerant stages. Thus, it should be understood that the presently-described embodiments are provided by way of example only and without limitation of the present disclosure. In that regard, the operation of air conditioning system 12 will now be described with reference to the steps illustrated in FIGS. 7-9B, and with regard to a single stage example (FIGS. 2-5) and a multi-stage example (FIG. 6).

In one embodiment, and referring to FIGS. 1, 2, and 6, tank 30 includes a temperature sensor mounted at or through the tank's housing to measure temperature of water within the tank. In another embodiment, water temperature is measured within the water flow circuit inlet to or outlet from water-cooled condenser 50 within housing 24 of system 12, rather than within tank 30 itself, and the temperature sensor is therefore disposed along water inlet line 14 or water outlet line 28. In either arrangement, the temperature sensor outputs a corresponding temperature signal to control circuit 56. The control circuit compares a temperature represented by the temperature sensor signal to a predetermined threshold related to the water heating system's high set point temperature. If the measured temperature is below the threshold, and if system 12 is presently operating in an air cooling mode (i.e. the control system, in response to thermostat signal(s) from building interior space 16, has actuated compressor 48 to circulate refrigerant through the refrigerant path, and actuated fans 21 and 29, to provide conditioned air to space 16), control circuit 56 actuates a relay (not shown) that switches three way valve 74 to direct refrigerant flow from the compressor to water-cooled condenser 50. The control system also actuates a relay (not shown) that actuates pump 52 to draw water from tank 30 (and/or, depending on the existence of a cold water call within the building's water system, cold water source 31) through fitting 32 and pipe 14 and convey the water on to water-cooled condenser 50, where the refrigerant circuit transfers heat to the water, which is returned to tank 30 via pipe 28 and fitting 33. System 12 operates in water heating mode until the call for cooling air in space 16 ends, or a temperature sensor at water line 28 or in tank 30 indicates the heated water provided by system 12 has reached a temperature near the target temperature for tank 30, or a pressure sensor in the refrigerant line indicates a high pressure condition. Regardless of the reason, once water heating ceases, system 12 will again move into a water heating mode if there is an air cooling call and if the temperature of water in tank 30 is below the predetermined temperature threshold. Repetition of this cycle thereby tends to increase the temperature of water in tank 30 toward the tank's target temperature.

Referring more specifically to the operation of system 12 in conjunction with water-heating system 38 and building 18, and with reference to FIGS. 1, 2, 6, and 7, assume at 701 that air-conditioning system 12 is in an inactive state or has transitioned out of a water-heating mode but that control system 56 receives a signal from the building's thermostat (not shown) or an intermediate control system of building 18 requiring the air conditioning system to provide cool air to conditioned space 16. In response, at 702, control system 56 initially actuates system 12 into an air-cooling, and air-cooled condensing, mode, regardless whether conditions might also exist to justify a water-heating mode, for a period of time (in this example, two minutes) sufficient to remove refrigerant that may remain in heat exchanger 50 from its previous operation. Control system 56 begins this process by actuating compressor 48. Where system 12 operates a multiple refrigerant lines/stages 58b, and depending on the requirements of the cooling call, control system 56 may instruct system 12 also to activate one or more additional-stage compressors 154. By activating compressors 48 and 154, control system 56 activates each compressor's corresponding refrigerant circuit, or stage. The control system sets three way valve 74 of the primary stage 58/58a through an electromechanical relay (not shown) to direct refrigerant from compressor 48 to air-cooled condenser 46 over refrigerant line portion 60. Refrigerant stage(s) 58b has a direct path between compressor 154 and the air-cooled condenser. With air conditioning system 12 accordingly in an air cooling/air-cooled condensing-only mode, without need for the control system to also select and actuate water-cooled condenser 50 in primary stage 58/58a, gaseous refrigerant flows from evaporator coil 54 to compressor 48/154 via refrigerant line sections 60. Compressor 48/154 pumps the gaseous refrigerant forward, increasing the refrigerant's pressure and temperature and causing the now-hotter refrigerant gas to flow to condenser 46 directly from compressor 154 and via three way valve 74 from compressor 48. Control system 56 actuates fan 29 (shown only in FIG. 6 but present in the embodiment of FIGS. 2-5) at a constant speed, or selected speed from a plurality of possible speeds, to thereby push or draw air over the condenser coils, causing the gaseous refrigerant to cool in coil(s) 46 and thereby change phase from a gas to a liquid. This draws heat energy from the refrigerant into the moving air, thereby dissipating heat from the refrigerant into the ambient environment. Because the refrigerant carries heat contributed to the refrigerant at the evaporator by air drawn from interior space 16 via duct 22, this transfers heat from the conditioned space to the ambient environment.

Still under the pressure provided by compressor 48/154, the now-liquid refrigerant flows from the output of condenser 46 back to evaporator 54 and expansion valve 158, if in refrigerant path 58b and, if in refrigerant path 58a, to a split 88 that connects refrigerant line portion 62 with refrigerant line portion 92 from a refrigerant output of heat exchanger 50. A check valve 94 in line 92 at split 88 prevents refrigerant flow from coil 46 from flowing toward heat exchanger 50, and the refrigerant therefore continues through refrigerant line portion 62 toward evaporator coil 54 and expansion valve 82. A filter 63 filters and removes moisture from the refrigerant upstream from the expansion valve(s).

Expansion valves 82/158 drop the pressure of the liquid refrigerant as it enters the respective coil portions of evaporator 54. Within the evaporator, the refrigerant transitions to gaseous phase, drawing heat energy from air driven by fan 21 (shown only in FIG. 6 but present in the embodiment shown in FIGS. 2-5) that flows across coil(s) 54. The evaporator fan draws air from interior space 16 (FIG. 1) through return duct 22 and moves the air, having passed across the evaporator, back into space 16 via supply duct 26. Thus, the recirculated air from building interior space 16 contributes the heat needed by the refrigerant in evaporator 54, cooling the indoor air being recirculated by the evaporator fan and thereby cooling conditioned indoor space 16. The now-warmer gaseous refrigerant discharged from evaporator coil(s) 54 then returns to compressor 48/154 via line section(s) 60, and the cycle repeats.

When control system 56 initializes air conditioning system 12, or transitions air conditioning system 12 from a water-cooled condensing mode (FIGS. 3 and 4) to an air-cooled condensing mode (FIG. 2), at 702, so that the system enters the operational mode discussed with respect to FIG. 2, some amount of refrigerant may remain in heat exchanger 50 and line 92 that, if not retrieved, would be omitted from the refrigerant flow circuit discussed above. Refrigerant circuit 58/58a is designed to accommodate a certain maximum heat load when utilizing all refrigerant in the circuit. To the extent the system operates in an air-cooling/air-cooled condenser mode with unutilized refrigerant remaining in the heat exchanger, the heat load capacity of refrigerant circuit 58/58a decreases, thereby increasing the temperature of the remaining refrigerant in the system as it attempts to handle the load and, in turn, increasing the compressor load. Accordingly, at 702, upon activating the compressor(s) and fans from an inactive state, or transitioning the system from a water-heating mode to the mode of FIG. 2, control system 56 also actuates a solenoid valve 68 that opens a refrigerant drain line 110/102 between refrigerant output line 92 of water-cooled condenser 50 and a point in the refrigerant path in the evaporator, which may be considered to include portions of the refrigerant path downstream from expansion valve 82 having a low pressure comparable to and caused by the low pressure in the evaporator coil(s), even if upstream of the evaporator coil itself. Because three way valve 74, in the mode shown in FIG. 2, directs the compressor output to air-cooled condenser 46 but not to heat exchanger 50, the refrigerant line in heat exchanger 50 and line 92 is depressurized, except for the effect of ambient heat and any residual heat from the heat exchanger's prior operation. The pressure in the refrigerant line in the evaporator is nonetheless at a lower pressure, and the opening of valve 68 therefore creates a pressure differential that draws refrigerant from the heat exchanger and line 92 to the evaporator, and thus back into the refrigerant flow circuit. While this drained refrigerant bypasses the expansion valve, thereby bypassing the pressure-dropping function the expansion valve performs, the drained refrigerant's pressure is already at a relatively low pressure. Control system 56 maintains valve 68 open only for a time sufficient to draw the retained refrigerant out of heat exchanger 50 and line 92. The length of this time can be determined through testing and calibration and stored in the programming of control system 56, and in the presently-described embodiments is two minutes. Accordingly, control system 56 maintains valve 68 in the open state for this predetermined period of time immediately following entrance to the air conditioning (air-cooled condensing) mode of FIG. 2.

Referring to FIGS. 1, 3, 6, and 7, at 704, control system 56 deactivates valve 68 upon expiration of the two minute window, and activates water pump 52 for a time, e.g. one minute in the present examples, sufficient to draw water from tank 30 (and/or source 31) through fitting 32 and into pipe 14, upstream and downstream from pump 52, so that a temperature sensor 152 affixed to or in water inlet pipe 14 can obtain an accurate sense of the temperature of water at the inlet to the heat exchanger. The time period depends on the time needed to acquire an accurate water temperature in view of variations in temperature of water from the tank. Temperature sensor 152 outputs a corresponding signal to control system 56, thereby providing a signal to the control system that corresponds to temperature of water in tank 30 and/or source 31. Alternatively, a temperature sensor may be provided in tank 30 that outputs a temperature signal to control system 56. Further, pressure sensor 72 is disposed at water inlet pipe 14 and outputs a signal to the control system indicating the pressure of the pumped water in pipe 14, in pound-force per square inch gauge (psig).

The control system checks the water pressure indicated by sensor 72 against a predetermined threshold water pressure value corresponding to a minimum pressure needed to assure water flow is present to flat plate heat exchanger 50. As will be apparent from the present disclosure, the threshold minimum pressure can be determined through calibration, and in the presently described examples is at a default value of five psig.

The control system also checks the temperature indicated by the temperature sensor signal to determine whether it is below a threshold temperature corresponding to a level sufficient to avoid pressure spikes in the refrigerant path, or 95° F. in the presently-described examples. As should be understood, water heating system 38 of building 18 operates to a high set point temperature at which the water heating system is intended to deliver water to the building's hot water fixtures. Traditional commercial water heating systems that provide hot water to ware washers, for example, maintain a high set point temperature of 185° F. or thereabout, while more recent systems, in which ware washers utilize chemical washing techniques, provide water at or about 140° F. In a 185° F. or 140° F. environment, a desirable temperature at which to maintain water in tank 30 may be within a range of at or about 120° F. to at or about 125° F., but it will be understood that the target water tank temperature depends upon the requirements for the given water system. To maintain the temperature of water in tank 30 at or near the target range, system 12 may be configured to provide water to tank 30 via pipe 28 at a temperature higher than the target 120° F.-125° F. range, in this example at a high threshold of at or about 138° F. In a system in which 140° F. may be the highest temperature at which the system is intended to deliver water, the 138° F. target in the presently-described examples provides heat to tank 30 without risk that the tank water will be too hot. The 138° F. target is, accordingly, the trigger temperature at which control system 56 deactivates water heating in system 12.

As noted, the low water threshold temperature at which control system 56 actuates water heating in system 12 (i.e. the temperature below which water in tank 30 will fall in the presently-described examples before control system 56 actuates water heating in system 12 from a non-water-heating state) is lower than both the high/deactivation threshold water temperature (138° F., in this example) and the desired water temperature range for tank 30 (120° F.-125° F., in this example), and in the embodiments described herein is 95° F. In such embodiments, the low water temperature threshold is chosen to avoid excessive switching of system 12 between water heating and air-cooled condensing modes but also to avoid pressure spikes within the refrigerant circuit of system 12. As described herein, the transition from air-cooled condensing mode to water-cooled condensing (i.e. water heating) mode changes the medium that removes heat from the refrigerant from ambient air to the water from tank 30. To the extent the low water temperature threshold is higher than the temperature of the ambient air, there may be an instantaneous increase in the heat-removal medium temperature when system 12 transitions to water heating mode, translating to an instantaneous decrease in the system's ability to remove heat from the refrigerant and, therefore, an increase in the refrigerant's temperature. Because heat corresponds to pressure in the refrigerant line, this relatively rapid transition can create a pressure spike in the refrigerant circuit. In this embodiment, therefore, the low water temperature threshold is selected near a high expected temperature of ambient air in the location of building 18, or otherwise through calibration of the system to determine a low threshold temperature that avoids pressure changes within a range as desired. It should be understood, however, that other arrangements are possible, and for example that the system may control the low pressure threshold to vary with measured temperature ambient to system 12/housing 24.

If, at 706, the water inlet pressure is less than five psig, or if the water inlet temperature is greater than 95° F., then the control system maintains the system in an air-cooling mode, utilizing air-cooled condenser 46 but not water-cooled condenser 50, for a period of time programmed into control system 56, for example ten minutes, as indicated at 708. Control system 56 may provide an option through its user interface to allow the system user to select the wait time, thereby allowing the wait period at 708 to vary as desired. Accordingly, air conditioning system 12 continues its air-cooled condensing operation, as initiated at 702, for ten minutes, and then again checks temperature and pressure at 706.

It should be understood that control system 56 may execute other functions as the system operates. For example, where the "yes" decision occurs at 706 due to a failure to meet the water inlet pressure threshold, the control system may initiate an error notice to a central computer system in building 18 or through the control system's user interface. Further, control system 56 repeatedly monitors the output of a pressure switch 76, which is configured to change state when/if pressure in line 58 exceeds a predetermined threshold (e.g. 610 psig or otherwise as set by regulatory requirement, and/or testing and/or component manufacturer rating). If, at any time, the output signal from switch 76 indicates pressure in the refrigerant line has exceeded the threshold, control system 56 immediately deactivates compressor 48 and initiates an alarm/error notice through a building central computer system and/or the control system's user interface. Alternatively, or in addition, the output from switch 76 may feed directly to the compressor and/or its power source, directly deactivating the compressor when the pressure switch's threshold is exceeded. A similar binary pressure switch is disposed at the refrigerant outlet of each compressor 154 of each, if any, additional refrigerant stage, and if the respective switch detects a high pressure condition in any such stage, the control system and/or the switch deactivates the corresponding compressor. Still further, control system 56 continuously monitors the instruction signals from the building thermostat. If that signal (i.e. the cooling call) indicates changed conditions, either indicating that the entire air conditioning system should cease operation, or that one or more stages of a multi-stage system are no longer needed, or that the heat load has decreased so that one or more such stages are no longer needed, the control system deactivates the corresponding compressor(s). Thus, although not indicated in the operational loop illustrated at steps 706/708, it should be understood that the control system may monitor and control various aspects of system operation as air conditioning system 12 continues in the air-cooling/air-cooled condensing mode and air-cooling/water-cooled condensing mode.

Figure 5:
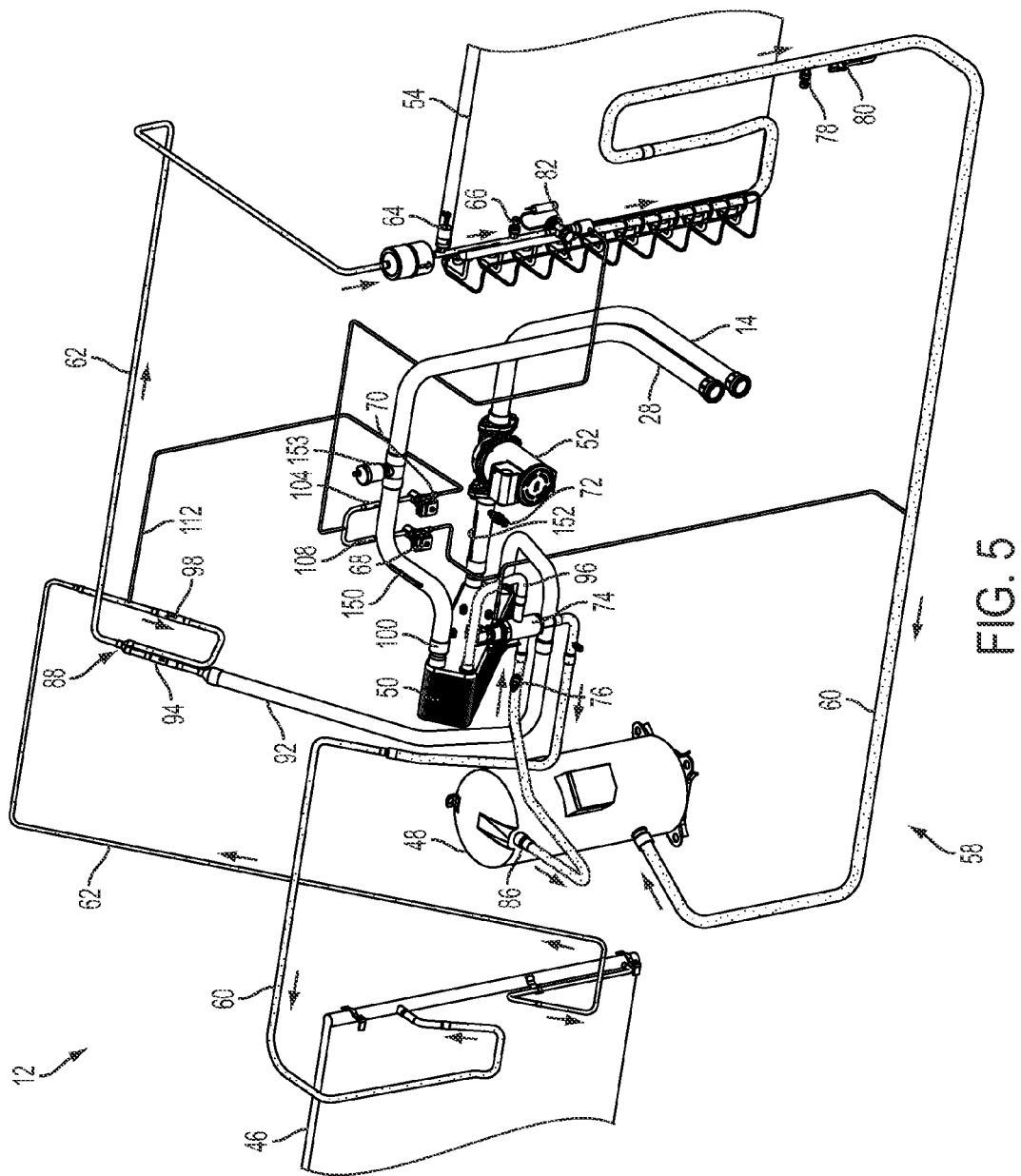
FIG. 5 is a schematic illustration of the air conditioning system illustrated in FIG. 2.
Figure 6:
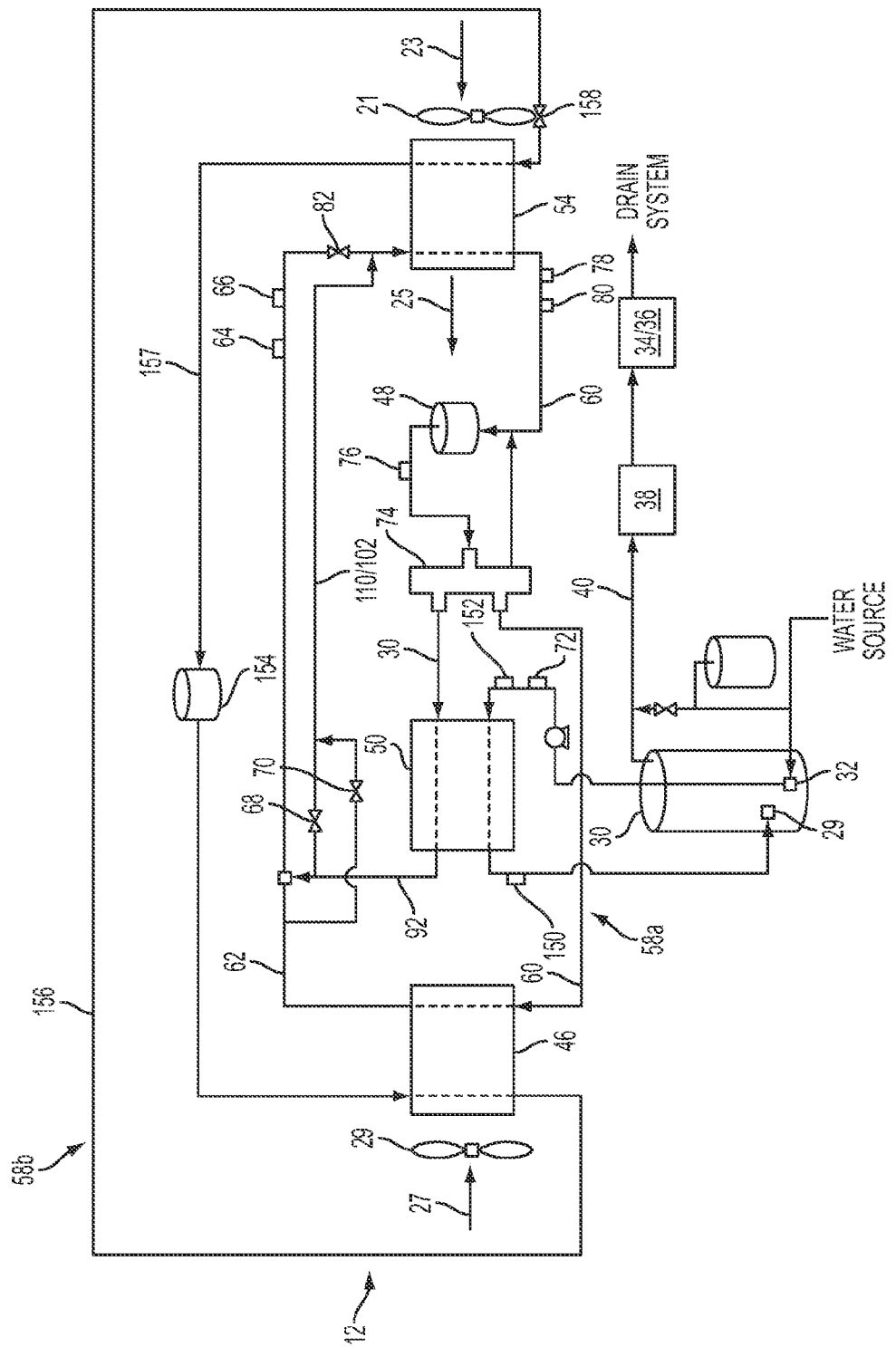
FIG. 6 schematic illustration of an air conditioning system as shown in FIG. 1.

During the wait time, and provided deactivation does not occur as a result of a high-pressure condition or a cooling call change, control system 56 operates air conditioning system 12 in the air-cooling/air-cooled condensing mode, as illustrated in FIG. 5. Gaseous refrigerant flows from evaporator coil(s) 54 to compressor 48/154 via refrigerant line sections 60. Compressor 48/154 pumps the gaseous refrigerant forward, increasing the refrigerant's pressure and temperature and causing the now-hotter refrigerant gas to flow to condenser 46 directly from compressor 154 and via three way valve 74. Fan 29 moves air across the condenser, drawing heat from and condensing the refrigerant. Still under pressure from compressor 48/154, the now-liquid refrigerant flows from the output of condenser 46 back to evaporator 54 via expansion valve 158, if in refrigerant path 58*b*, and, if in refrigerant path 58*a*, to split 88 and refrigerant line 62 to the evaporator via expansion valve 82. Expansion valve(s) 82/158 drop the pressure of the liquid refrigerant as it enters the respective coil portions of evaporator 54. Fan 21 moves air across the evaporator, and the refrigerant transitions to gaseous phase, drawing heat energy from the flowing air. Thus, the circulating air from building interior space 16 contributes the heat needed by the refrigerant in coil 54, thereby cooling the indoor air flowing back to conditioned indoor space 16. The now-warmer gaseous refrigerant discharged from evaporator coil(s) 54 then returns to compressor 48/154 via line section(s) 60, and the cycle repeats.

Still referring to FIGS. 1, 3, 6, and 7, if at 706 the water inlet pressure is greater than five psig and water inlet temperature is less than 95° F., then water heating system 38 of building 18 is considered to be in need of refrigerant heat to warm the water in tank 30. In this embodiment, switching from the air-cooling/air-cooled condensing mode to an air-cooling/water-cooled condensing mode involves moving three way valve 74 so that the three way valve directs the refrigerant from compressor 48 to water-cooled condenser/heat exchanger 50 and not to air-cooled condenser 46. This change in the circuit of refrigerant path 58/58*a* depressurizes that part of the refrigerant path from compressor 48 to (and through) condenser 46 and on to split 88. The refrigerant path from heat exchanger 50, through output line portion 92 and the part of refrigerant line portion 62 downstream from split 88, is pressurized, thereby preventing refrigerant remaining in the now-depressurized part of the path from draining downstream to evaporator 54. A refrigerant drain line 112/102 therefore fluidly connects the main refrigerant line portion 62, upstream of split 88, to a point in the refrigerant line at evaporator 54, which can be considered to include that portion of the refrigerant line proximate the evaporator's coil portion but downstream from expansion valve 82, as discussed above. Pressure at the evaporator is typically lower than pressure in the depressurized portion of line portion 62, which retains some pressurization due to residual heat, so that when control system 56 actuates a relay to open solenoid valve 70 (which is normally closed), to thereby open drain line 112/102, drain line 112/102 drains to the evaporator that refrigerant remaining in the refrigerant path extending from compressor 48 to split 88 through condenser 46. In the embodiments illustrated in FIGS. 2-6, the drain line is coextensive in part with the drain line between the heat exchanger refrigerant output and the evaporator, and in that regard a check valve 108 prevents refrigerant flowing between the depressurized condenser 46 and the evaporator from flowing into the heat exchanger output line.

However, if the air ambient to system 12 is sufficiently cold, residual heat in the now-depressurized part of the refrigerant line through condenser 46 (particularly because condenser 46 is air-cooled and, therefore, sensitive to ambient air temperature) can be insufficient to generate a sufficient pressure differential to drain the refrigerant from compressor 46 to the evaporator. Similar to the situation discussed above, regarding the need to drain refrigerant from the heat exchanger upon entry to the condition illustrated in FIG. 2, the residual refrigerant in compressor 46 is needed to circulate in the refrigerant path's active portion during air-cooling/water-cooled condensing mode (i.e. air-cooling/water heating mode) in order to accommodate the heat load the system can be expected to bear. Accordingly, at 710 and prior to transitioning the system to air cooling/water-cooled condensing mode, control system 56 checks the output signal of a thermistor (not shown) mounted to or otherwise proximate system 12 so as to measure temperature of air ambient to system 12. Through testing of system 12 in a given configuration, it may be determined (a) that there is a minimum pressure differential between the depressurized portion of the refrigerant path through condenser 46 and the refrigerant path at the evaporator that is needed to drain refrigerant from the depressurized refrigerant path to the evaporator and (b) that, regardless of refrigerant line pressure at the evaporator, the actual pressure differential will always be at least as great as this desired pressure differential above a certain ambient air temperature. Although it should be understood that this threshold temperature can vary with configuration variations of system 12, in the presently described embodiments the initial threshold ambient air temperature is 80° F. Thus, if at 710 control system 56 determines that the output signal from the ambient thermistor indicates a temperature at or above 80° F., control system 56 proceeds to convert system 12 from air-cooling/air-cooled condensing mode to air-cooling/water-cooled condensing mode at 712.

Even if the ambient air temperature indicated by the ambient temperature sensor signal is below 80° F., however, the desired pressure differential may nonetheless exist, primarily due to possible variations in the refrigerant line pressure in evaporator 54. Accordingly, if the ambient air temperature sensor indicates an ambient temperature below 80° F., control system 56 at 710 checks the state of the following relationship:

$$0.0202(Ambient^{**}2)+0.5188(Ambient)-20.071>\text{Evaporator Pressure},$$

where "0.0202(Ambient2)+0.5188(Ambient)" describes the normal pressure curve for the refrigerant in refrigerant line 58/58a, "Ambient" is the temperature indicated by the signal from the temperature sensor ambient to system 12, "20.071" is the desired pressure differential between the portions of the refrigerant path in the depressurized condenser 46 and the evaporator, and "Evaporator Pressure" is a pressure indicated by the output of a pressure sensor 78 in the refrigerant line downstream from but proximate to evaporator 54 (that is, a point in the refrigerant line that can be considered part of the evaporator portion of the refrigerant line, or at the evaporator, in terms of refrigerant pressure). As should be understood, the pressure of a refrigerant in an enclosed line depends on the given refrigerant and the temperature ambient to the line and can be described by a formula specific to those variables. Typically, the refrigerant manufacturer publishes the formula for a refrigerant it markets, and in the case of the refrigerant used in the presently described examples (R410A), the pressure curve formula is 0.0202(Ambient2)+0.5188(Ambient). For a given construction of system 12, and given the formula and variations in temperature as measured by the ambient temperature sensor, system 12 may be tested to determine the offset, in this example 20.071.

Control system 56 performs the relationship check when system 12 is the air-cooling/air-cooled condensing mode, before transitioning system 12 to the air cooling/water-cooled condensing mode. If, at 710, the ambient temperature is less than 80° F., and the state of the relationship above is "true," then control system 56 proceeds to convert system 12 from air-cooling/air-cooled condensing mode to air-cooling/water-cooled condensing mode, at 712. If, however, the state of the relationship is "false," control system 56, at 714, deactivates fan 29, and in the event multiple refrigerant stages are present, deactivates compressor(s) 154, but maintains compressor 48 and fan 21 active, so that the recirculating air and compressor contribute heat to the circulating refrigerant, which is directed to condenser 46 without heat removal by an air flow at the condenser, thereby increasing refrigerant heat and pressure.

Through testing of a given configuration of system 12, the user can determine a pressure at pressure sensor 66, measured prior to transition to air-cooling/water-cooled condensing mode (i.e. in air-cooled condensing mode), that will always provide the desired pressure differential after transition to air-cooling/water-cooled condensing mode that is sufficient to drain the refrigerant from the depressurized portion of the refrigerant path. In the presently-described embodiments, for example, control system 56 operates system 12 in air-cooled condensing mode (with fan 29 deactivated) until detecting, at 716, a pressure of 545 psig, as indicated by the output signal from pressure sensor 66.

When the check at 716 indicates pressure has reached 545 psig, or if the test is passed at 710, then at 712 control system 56 deactivates condenser fan 29 and changes the setting of three way valve 74 so that the refrigerant flows from compressor 48 via output fitting 86 to an input of flat plate heat exchanger 50 over a refrigerant connector line 96 and does not flow to air-cooled condenser 46. While other types of heat exchanger could be used, a flat plate exchanger is used in the embodiments described herein because of the heat exchanger's compactness and its resistance to unintentional mixing of water and refrigerant. As noted above, refrigerant output line 92 connects the refrigerant output of heat exchanger 50 to refrigerant flow line 62 via check valve 94 and split 88. A check valve 98 blocks flow of refrigerant from split 88 back to condenser coil 46. Thus, liquid refrigerant exiting heat exchanger 50 flows through the portion of refrigerant line 62 downstream of split 88 to expansion valve 82 and, thereby, to evaporator coil 54. As discussed above with regard to FIG. 5, control unit 56 actuates the evaporator fan to thereby move recirculating air across the evaporator coil(s) to contribute energy to the refrigerant within evaporator 54 and correspondingly cool the recirculating air. The now-warmer gaseous refrigerant discharged from evaporator 54 then returns to compressor 48 via refrigerant line portion 60, and the cycle repeats. Where only one refrigerant stage 58 is present in system 12, condenser fan 29 can be deactivated during this operational mode. If one or more additional refrigerant stages are present, however, and if the then-pending cooling call requires their operation, the control system maintains their compressors active during this mode and, therefore, maintains condenser fan 29 active.

Simultaneously, control system 56 actuates pump 52 to draw water from input line 14 from tank 30 via fitting 32. Pump 52 displaces the water into heat exchanger 50, where the hot refrigerant gas delivered to the heat exchanger from compressor 48 transfers heat to the water. Heat exchanger 50 outputs the now-warmer water at output fitting 100 into water output pipe 28 and, thereby, back to tank 30 (FIG. 1). The flow capacity and heat exchange capacity of heat exchanger 50 are such that heat exchanger 50 removes sufficient energy from the condenser output refrigerant to the gaseous refrigerant to a liquid. Thus, as should be apparent from the present disclosure, the capacity and operational specifics of heat exchanger 50 may be chosen so that the heat exchanger, when operating to heat water, functionally replaces condenser coil 46. Thus, water-cooled condenser 50 substitutes for air-cooled condenser 46 in performing the condenser function, but instead of rejecting the heat removed from the refrigerant into the ambient environment, heat exchanger (water-cooled condenser) 50 transfers the rejected heat to water in the building's water heating system.

As discussed above, at the time the control system transitions air conditioning system 12 from the air cooling/air-condensing mode to the air-cooling/water-cooled condensing mode, condensed refrigerant remains in condenser 46 that is needed for the overall air conditioning function. Accordingly, simultaneously with switching three-way valve 74 to direct refrigerant from compressor 48 to water-cooled condenser 50 instead of air-cooled condenser 46, control system 56 actuates solenoid valve 70, which thereby opens refrigerant drain line 112/102 between the portion of refrigerant line 62 upstream from split 88 and evaporator 54.

Control system 56 maintains valve 70 open for a time sufficient to draw residual refrigerant from condenser coil 46 and the upstream portion of line 62. In the above-described embodiments, this time period is approximately two minutes, but it will be understood that the amount of time will depend upon the particular configuration of air conditioning system 12 and that the time period may be determined through testing and calibration of the system and programmed into control system 56. At the end of this predetermined time period, control system 56 sends a signal to a relay that controls solenoid valve 70 to cause the valve to close. After this point, refrigerant flows from compressor 48 to heat exchanger 50 to evaporator 54, and back to compressor 48, as described above and as illustrated in FIG. 4.

Figure 4:
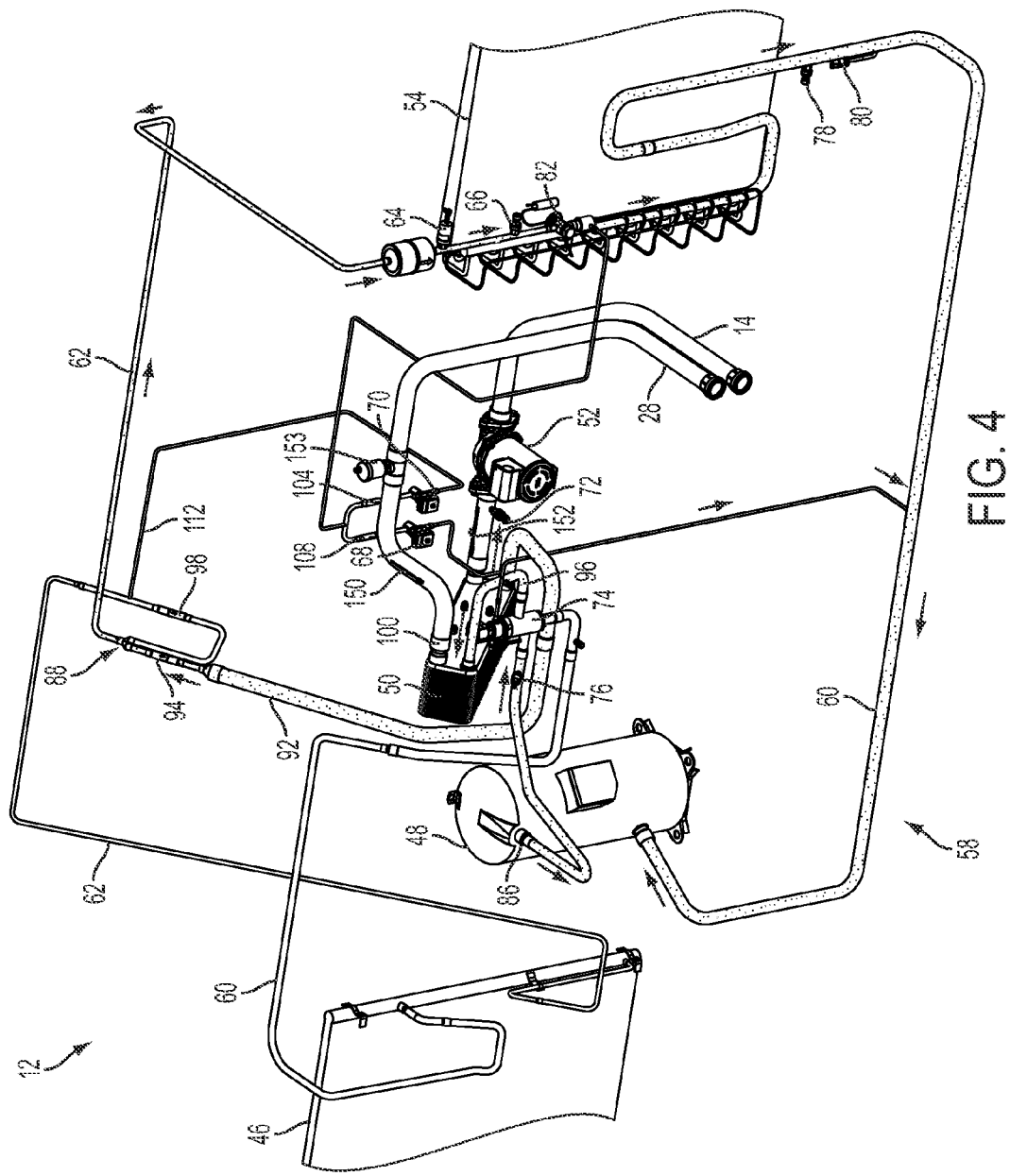
FIG. 4 is a schematic illustration of the air conditioning system illustrated in FIG. 2.

With regard to the operation of system 12 in water-heating mode, as shown in FIG. 4, the transition from air to water as the heat removal medium can decrease the system's ability to remove heat from the refrigerant flowing through the refrigerant path, in that as the water being cycled through water-cooled condenser 50 and tank 30 increases in temperature, the water's capacity to remove heat from the refrigerant can decrease. This may increase pressure at the output of compressor 48. Accordingly, when pressure sensor 66 provides a signal to control system 56 indicating a pressure level of 565 psig, or that a high pressure condition (e.g. 545 psig) has been reached within one minute of the transition to water heating mode, the control system opens a port within three way valve 74 to a bypass refrigerant path 97 to the return refrigerant line 60 from the line in the three way valve that receives the output of compressor 48. This causes hot refrigerant gas from compressor 48 to bypass heat exchanger 50 and evaporator 54 and flow directly back to compressor 48.

Figure 8:
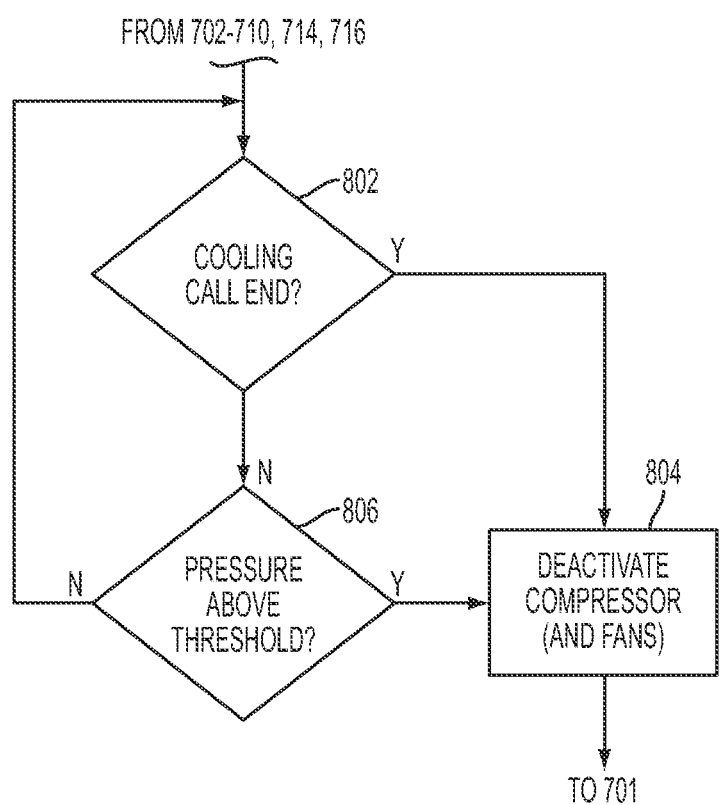
FIG. 8 is a flow diagram illustrating operation of the air conditioning systems as illustrated in FIGS. 1-6.

Referring to FIG. 8, and as noted above, control system 56 regularly checks signals from the building thermostat for a cooling call and the output of temperature sensor 76. If at any time (802) during air-cooling/air-cooled condensing mode, control system 56 receives a signal from the thermostat of building 18 (FIG. 1) indicating that the cooling cycle of refrigerant circuit 58/58a/58b (FIGS. 2-6) should end, then at 804 the control system deactivates the compressor(s) of the corresponding refrigerant stage(s). If the cooling call ends for all refrigerant stages (if a multi-stage arrangement), the control system also deactivates condenser fan 29 and evaporator fan 21 at 804. If at 802 the cooling call(s) remains in effect, at 806 the control system checks to determine if the refrigerant pressure sensor 76 for any refrigerant stage has changed state, indicating a pressure in the refrigerant line for that stage greater than the high level pressure threshold, in this instance 610 psig. If so, the control system deactivates the corresponding refrigerant stage, at 804. If pressure at 806 has not reached the turn-off threshold, the control system returns to check the cooling call at 802.

Figure 7:
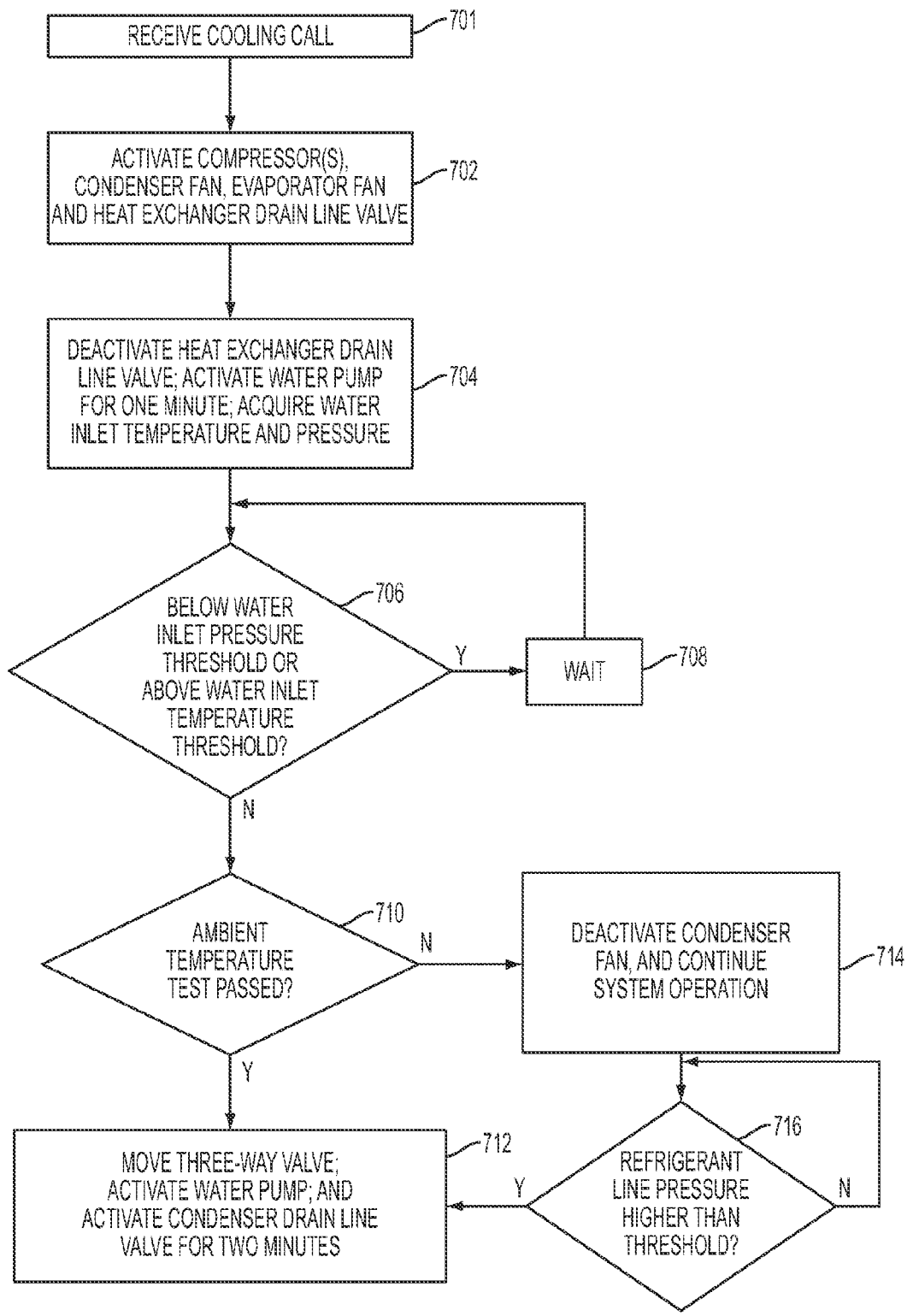
FIG. 7 is a flow diagram illustrating operation of the air conditioning systems as illustrated in FIGS. 1-6.
Figure 9A:
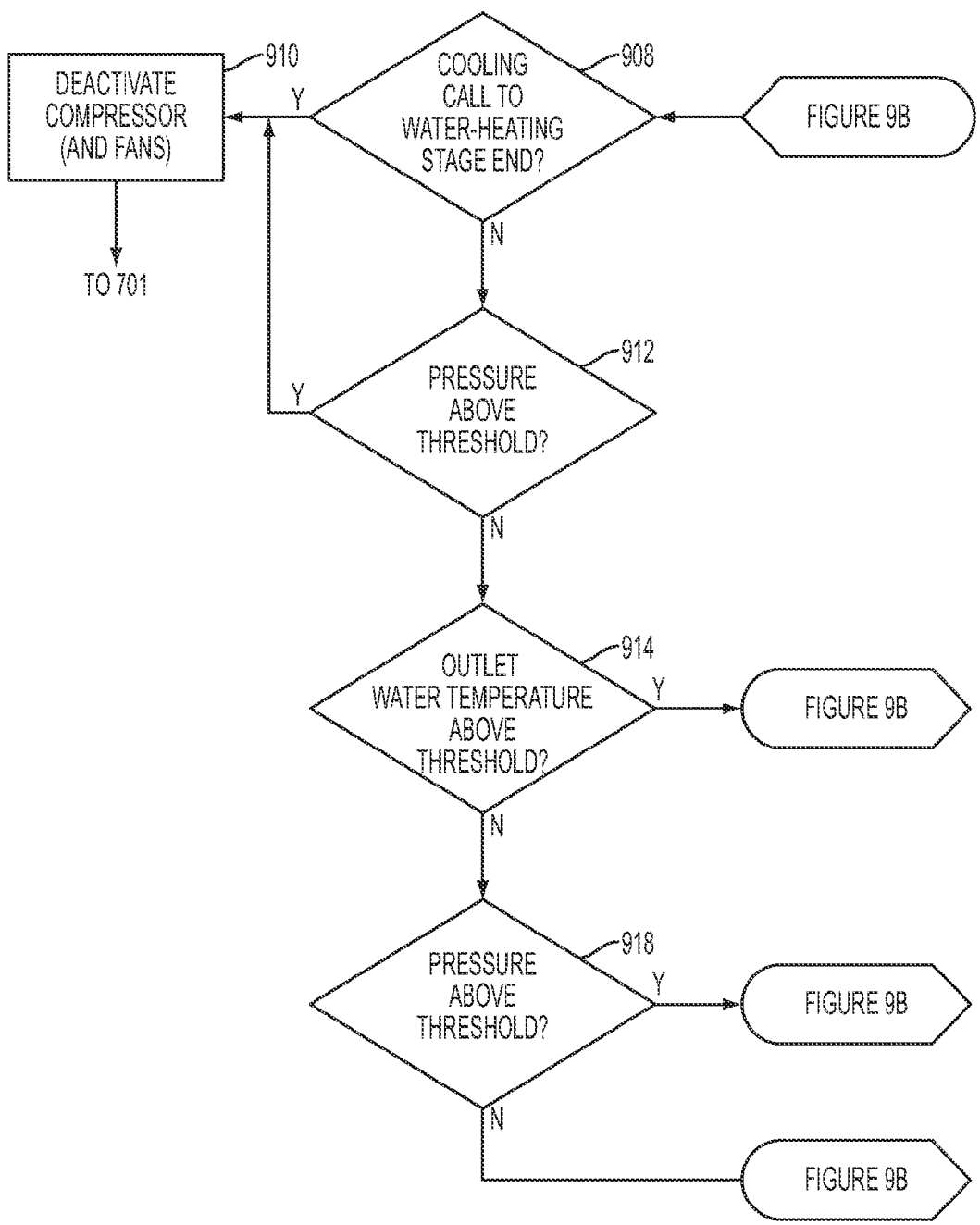
FIGS. 9A and 9B are a flow diagram illustrating operation of the air conditioning systems as illustrated in FIGS. 1-6.
Figure 9B:
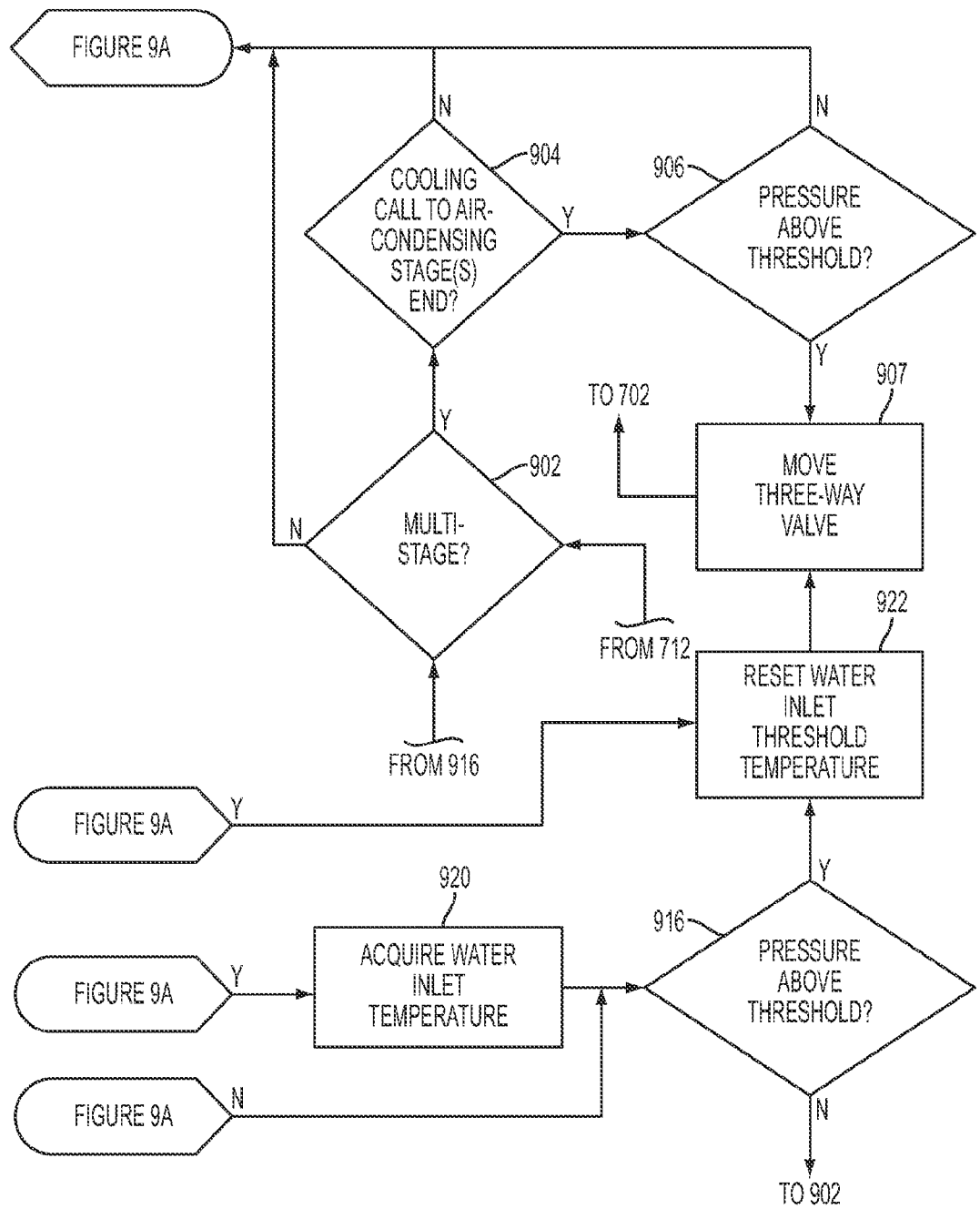

Referring to FIGS. 9A and 9B, the repeating system management routine of FIG. 8 expands when the system operates in air-cooling/water-cooled condensing mode. For example, if system 12 is operating multiple refrigerant circuit stages while one of the stages operates in a water-heating mode, and if the cooling call for one of the other stages ends, the system may experience an increased likelihood of a pressure spike. The likelihood may arise where one of the refrigerant stages stops circulating through the evaporator, in that the remaining refrigerant paths, including the refrigerant path that is in water-heating mode, may have to take on more responsibility to remove heat from the air passing across the evaporator coils. As noted above, a refrigerant path that is in water heating mode depends on water from tank 30 to remove the heat on the condenser side of the circuit, but as the tank temperature increases, the water's capacity to remove heat can decrease. In total, therefore, this process can cause an increase in refrigerant temperature, increasing the likelihood of a rapid rise in pressure. Through system testing, a refrigerant pressure can be determined above which this likelihood arises. In the present examples, this threshold is 520 psig at pressure sensor 66 (FIGS. 2-6), but it should be understood that this threshold can vary with system configuration. It should be understood that a binary pressure switch, such as switch 76, could be used for a similar purpose. Additionally, while pressure sensor 66 is at the evaporator (and in particular proximate the expansion valve) because a pressure change is likely to be evident at that point in the refrigerant path, it should be understood that pressure can be measured for this purpose at other points in the refrigerant path. Accordingly, if at 902 system 12 is operating in a multi-refrigerant circuit mode, the control system checks at 904 the cooling call from the thermostat of building 18 (FIG. 1). If at 904 a cooling call for any of the non-water-heating stages ends, then at 906 control system 56 checks the output signal of pressure sensor 66 in the water-heating refrigerant stage. If at 906 this pressure is greater than 520 psig, the control system changes three way valve 74 (FIGS. 2-6) at 907 to direct the refrigerant from compressor 48 (FIGS. 2-6) to the air-cooled condenser and not to the water-cooled condenser, and returns to step 702 (FIG. 7). If system 12 is not in a multi-stage refrigerant circuit mode at 902, or there is no secondary refrigerant stage cooling call end at 904, or the pressure at sensor 66 is less than 520 psig at 906, control system operation proceeds to 908.

If at 908, control system 56 receives a signal from the thermostat of building 18 (FIG. 1) indicating that the cooling cycle of the water-heating refrigerant circuit 58/58a (FIGS. 2-6) should end, then at 910 the control system deactivates compressor 48 (FIGS. 2-6). If the cooling call has ended for all refrigerant stages (if a multi-stage arrangement), the condenser fan 29 and evaporator fan 21 are also deactivated at 910, unless the system is being operated in a mode (controlled typically from the thermostat) in which the fan continues operation regardless of the compressor's activation. If at 908 the cooling call remains in effect, at 912 the control system checks to determine if the refrigerant pressure switch 76 has changed state, indicating a refrigerant line pressure greater than the high level pressure threshold, in this instance 610 psig. If so, the control system deactivates the refrigerant stage at 910.

If pressure at 912 has not reached the turn-off threshold, the control system checks the temperature of the water exiting from heat exchanger 50 in water outlet pipe 28, as indicated by the output signal of a water temperature sensor 150 (FIGS. 2-6) in pipe 28. As described above, control system 56 executes the water-heating mode to heat water from water storage tank 30 toward a target temperature for use in the water heating system of building 18, in these embodiments within a range of about 120° F. to about 125° F. The control system therefore checks at 914 whether the temperature of water leaving the heat exchanger is at a maximum temperature indicating that the water in tank 30 (which is recirculating back through the heat exchanger as the control system repeatedly draws water up from tank 30 for heating) has likely reached the target range, in this example at or about 138° F. As noted above, the system may be tested to determine the particular threshold water temperature for a given configuration of system 12. If at 914 control system 56 receives a signal from temperature sensor 150 indicating that the temperature of water exiting the heat exchanger has exceeded the 138° F. water heating threshold, then the control system changes three way valve 74 (FIGS. 2-6) at 907 to direct the refrigerant from compressor 48 (FIGS. 2-6) from the water-cooled condenser to the air-cooled condenser, and returns to step 702 (FIG. 7).

If at 914 the outlet water temperature is below the water temperature threshold, the control system checks the output of refrigerant circuit pressure sensor 66 to determine if the refrigerant line pressure at the evaporator is at a level approaching a point at which pressure sensor 76 may change state and thereby trigger a pressure-based system shut down. As discussed above, refrigerant line pressure may be higher in water-cooled condensing mode relative to the pressure that would occur in an air-cooled condensing mode under similar circumstances because water from tank 30, as it recirculates through the heat exchanger and increases in temperature, becomes less able than ambient air moved across the air-cooled condenser to remove heat from the refrigerant. Accordingly, if the control system detects that the refrigerant line is approaching a pressure fault level, the control system transitions system 12 from air-cooling/water-cooled condensing mode to air-cooling/air-cooled condensing mode, thereby immediately enabling system 12 to remove more heat from the refrigerant than in water-cooled condensing mode and possibly moving the system away from the pressure fault.

The control system determines refrigerant line pressure from pressure sensor 66, at the evaporator upstream from the expansion valve. Because pressure sensor 66 is offset in the refrigerant line from pressure switch 76, and is further downstream from the compressor, there is an inherent pressure drop from switch 76 to sensor 66, which may be determined through testing of a given configuration of system 12. Having conducted such testing and determined the inherent pressure drop, and having included a further pressure offset to correspond to a pressure at a level below the high pressure fault level to allow sufficient time for the system, once transitioned to air-cooled condensing mode, to begin moving the refrigerant pressure lower before a rising pressure causes pressure switch 76 to detect a fault level pressure (e.g. twenty psig), control system 56 checks the output of pressure sensor 66 at 916 to determine whether the preliminary threshold refrigerant pressure level has been reached or exceeded. In the embodiments described herein, the preliminary threshold refrigerant level is 570 psig, although it should be understood that the threshold level can vary with varying configurations of system 12. Alternatively, the control system can monitor refrigerant pressure at the output of compressor 48, and in that event the preliminary threshold refrigerant pressure level is the trigger level (610 psig), less the further pressure offset. If the control system detects that the refrigerant line pressure at 66 exceeds the preliminary fault level, the control system transitions system 12 from air-cooling/water-cooled condensing mode to air-cooling/air-cooled condensing mode, at 907.

One possible cause for refrigerant pressure rising in system 12 at a level sufficient to cause the system to transition from water-cooled condensing to air-cooled condensing at 916 is a drop in temperature in conditioned space 16 of building 18 (FIG. 1). As the conditioned air temperature in space 16 drops, the recirculating air moving across evaporator 54 is correspondingly less able to contribute heat to the refrigerant moving through the evaporator. This, in turn, increases pressure in the refrigerant line to the extent refrigerant does not fully evaporate. As described above, the threshold pressure for moving refrigerant circuit 58 from air-cooled condensing mode to water-cooled condensing mode at 706 (FIG. 7) is determined based on an assumption about the normal operation of system 12, in particular the temperature of the recirculating air that passes across the evaporator. If the temperature of that recirculating air is now lower than the basis for that assumption, the water temperature triggering threshold at step 706 may need to change. Accordingly, prior to checking the pressure at sensor 66 at step 916 for the preliminary threshold refrigerant pressure level, the control system checks, at 918, the pressure level at sensor 66 and determines whether refrigerant line pressure has reached a level (in this example, twenty psig below the preliminary threshold refrigerant pressure level, or 550 psig) indicating a likelihood that the control system will need to transition system 12 from water-cooled condensing to air-cooled condensing at 918. If the refrigerant line pressure at 66 does not exceed this level at 918, control system 56 proceeds directly to step 916.

If, however, the refrigerant line pressure does exceed the anticipatory pressure level at 918, then at 920, control system 56 acquires water inlet temperature from water temperature sensor 152 (FIGS. 2-6). Because the temperature of water in tank 30 and, therefore, flowing into system 12 over pipe 14 tends to vary directly with temperature of air in space 16, control system 56 measures water temperature as a proxy for air temperature. It should be understood, however, that control system 56 can alternatively measure indoor space 16 temperature directly from a temperature sensor or thermostat that is located in space 16 and is in communication with control system 56. If the pressure detected at 916 then triggers transition of system 12 from air-cooled condensing mode to water-cooled condensing mode, control system 56 adjusts the water temperature trigger threshold for use at step 706, at step 922. If the water temperature measured at step 920 is below 105° F., the control system changes the water temperature trigger threshold for use at 706 to 85° F. If the water temperature measured at step 920 is between 105° F. and 110° F., the water temperature trigger threshold is 90° F. at 922. If the water temperature measured at step 920 is between 110° F. to 115° F., the temperature trigger threshold for step 706 is 95° F. If the water temperature measured at step 920 is between 115° F. and 120° F., the water temperature trigger threshold is 97° F. at 922. If the water temperature measured at step 920 is greater than 120° F., the water temperature trigger threshold is 100° F. These trigger level temperatures can be determined, for example, by trial and error. Upon resetting the trigger threshold at 922, the control system proceeds to transition system 12 from air-cooled condensing mode to water-cooled condensing mode, at 907.

Modifications and variations to the particular embodiments of the present invention may be practiced by those of ordinary skill in the art, without departing from the spirit and scope of the present invention, one or more embodiments of which are particularly set forth in the appended claims. In addition, it should be understood that aspects of the various embodiments may be interchanged in whole or in part. Furthermore, those of ordinary skill in the art will appreciate that the foregoing description is by way of example only and is note intended to limit the invention so further described in the appended claims.

What is claimed is:

1. A system for conditioning air and for heating water, comprising:
   a refrigerant path;
   a first condenser in the refrigerant path and disposed in an air flow path so that the first condenser transfers heat to air in the air flow path from refrigerant moving through the first condenser in the refrigerant path;
   a second condenser in the refrigerant path and that defines a water flow path so that the second condenser transfers heat to water in the water flow path from refrigerant moving through the second condenser in the refrigerant path;
   an evaporator in the refrigerant path and disposed in a second air flow path so that air in the second air flow path transfers heat to refrigerant moving through the evaporator;
   a compressor in the refrigerant path and configured to move refrigerant in the refrigerant path;
   a three-way valve comprising a first connection to a first output line in the refrigerant path from the compressor, a second connection to an input line in the refrigerant path to the first condenser, and a third connection to an input line in the refrigerant path to the second condenser;
   a port in the three-way valve, comprising a fourth connection distinct from each of the first connection, the second connection, and the third connection, the fourth connection connected to a bypass refrigerant path connected to an input to the compressor in the refrigerant path where such input is downstream from the evaporator with respect to the refrigerant path;
   a second output line in the refrigerant path from the first condenser to the evaporator; and
   a control system in operative communication with the refrigerant path and the three-way valve configured to selectively direct refrigerant flow from the first connection, through the second connection to the first condenser or through the third connection to the second condenser,
   upon directing refrigerant flow through the third connection to the second condenser without directing refrigerant flow through the second connection to the first condenser, draining refrigerant from the first condenser, in response to pressure in the first condenser or the second output line, and
   selectively open the port in the three-way valve in response to pressure in the first output line.

2. The system as in claim 1, including a temperature sensor in the water flow path and wherein the control system is configured to selectively direct refrigerant flow from the first connection, through the second connection to the first condenser or through the third connection to the second condenser responsively to an output signal of the temperature sensor.

3. The system as in claim 2, including a pump in the water flow path so that the pump moves water through the water flow path.

4. The system as in claim 1, wherein the control system is configured to drain the refrigerant from the first condenser to the evaporator.

5. The system as in claim 4, wherein the control system is configured to drain refrigerant from the first condenser to the evaporator in response to a difference between a pressure in the evaporator and the pressure in the first condenser or the second output line.

6. The system as in claim 5,
   comprising a temperature sensor disposed with respect to the second output line to detect an air temperature ambient to the second output line,
   wherein the temperature sensor outputs a signal to the control system corresponding to the ambient temperature, and
   wherein the control system is configured to compare the ambient temperature represented by the signal output from the temperature sensor to a predetermined temperature at which the difference is sufficient to permit the refrigerant to drain from the first condenser or the second output line to the evaporator and, if the ambient temperature represented by the signal is greater than the predetermined temperature, to drain the refrigerant from the first condenser to the evaporator.

7. The system as in claim 6, comprising a refrigerant drain line between the first condenser and the evaporator, and a valve in the refrigerant drain line, wherein the control system is in operative communication with the drain line valve to selectively open and close the drain line valve in response to comparison between the ambient temperature represented by the signal output from the temperature sensor and the predetermined temperature.

8. The system as in claim 6,
   comprising a pressure sensor in the refrigerant path at the evaporator that outputs a signal to the control system corresponding to pressure of refrigerant in the evaporator,
   wherein the control system is configured, if the ambient temperature represented by the signal from the temperature sensor is greater than the predetermined temperature, to compare a threshold pressure based on the ambient temperature represented by the signal from the temperature sensor to the pressure of refrigerant in the evaporator, and drain the refrigerant from the first condenser to the evaporator if comparison of the threshold pressure to the pressure of refrigerant in the evaporator meets a predetermined criteria.

9. A system for conditioning air and for heating water, comprising:
a refrigerant path;
a first condenser in the refrigerant path and disposed in a first air flow path so that the first condenser transfers heat to air in the first air flow path from refrigerant moving through the first condenser in the refrigerant path;
a second condenser in the refrigerant path and that defines a water flow path so that the second condenser transfers heat to water in the water flow path from refrigerant moving through the second condenser in the refrigerant path;
an evaporator in the refrigerant path and disposed in a second air flow path so that air in the second air flow path transfers heat to refrigerant moving through the evaporator;
a compressor in the refrigerant path and configured to move refrigerant in the refrigerant path;
a three-way valve comprising a first connection to a first output line in the refrigerant path from the compressor, a second connection to an input line in the refrigerant path to the first condenser, and a third connection to an input line in the refrigerant path to the second condenser;
a port in the three-way valve, comprising a fourth connection distinct from each of the first connection, the second connection, and the third connection, the fourth connection connected to a bypass refrigerant path connected to an input to the compressor in the refrigerant path where such input is downstream from the evaporator with respect to the refrigerant path;
a second output line in the refrigerant path from the first condenser to the evaporator, the second output line having an expansion valve; and
a control system in operative communication with the refrigerant path and the three-way valve configured to
selectively direct refrigerant flow from the first connection, to the second connection to the first condenser or to the third connection to the second condenser,
upon directing refrigerant flow to the third connection to the second condenser without directing refrigerant flow to the second connection to the first condenser, draining refrigerant from the first condenser into a flow between the second condenser and the evaporator, in response to pressure in the first condenser or the second output line, and
selectively open the port in the three-way valve in response to pressure in the first output line.

10. The system as in claim 9, including a temperature sensor in the water flow path and wherein the control system is configured to selectively direct refrigerant flow through the second connection to the first condenser or the third connection to the second condenser responsively to an output signal of the temperature sensor.

11. The system as in claim 9, wherein the control system is configured to drain the refrigerant from the first condenser to the evaporator.

12. The system as in claim 11, wherein the control system is configured to drain refrigerant from the first condenser to the evaporator in response to a difference between a pressure in the evaporator and the pressure in the first condenser or the second output line.

13. The system as in claim 12,
comprising a temperature sensor disposed with respect to the second output line to detect a temperature ambient to the second output line,
wherein the temperature sensor outputs a signal to the control system corresponding to the ambient temperature, and
wherein the control system is configured to compare the ambient temperature represented by the signal output from the temperature sensor to a predetermined temperature at which the difference is sufficient to permit the refrigerant to drain from the first condenser or the second output line to the evaporator and, if the ambient temperature represented by the signal is greater than the predetermined temperature, to drain the refrigerant from the first condenser to the evaporator.

14. The system as in claim 13, comprising a refrigerant drain line between the first condenser and the evaporator, and a valve in the refrigerant drain line, wherein the control system is in operative communication with the drain line valve to selectively open and close the drain line valve in response to comparison between the ambient temperature represented by the signal output from the temperature sensor and the predetermined temperature.

15. The system as in claim 13,
comprising a pressure sensor in the refrigerant path at the evaporator that outputs a signal to the control system corresponding to pressure of refrigerant in the evaporator,
wherein the control system is configured, if the ambient temperature represented by the signal from the temperature sensor is greater than the predetermined temperature, to compare a threshold pressure based on the ambient temperature represented by the signal from the temperature sensor to the pressure of refrigerant in the evaporator, and drain the refrigerant from the first condenser to the evaporator if comparison of the threshold pressure to the pressure of refrigerant in the evaporator meets a predetermined criteria.

16. A system for conditioning air, and for heating water, comprising: a refrigerant path;
a first condenser in the refrigerant path and disposed in a first air flow path so that the first condenser transfers heat to air in the first air flow path from refrigerant moving through the first condenser in the refrigerant path;
a second condenser in the refrigerant path and that defines a water flow path so that the second condenser transfers heat to water in the water flow path from refrigerant moving through the second condenser in the refrigerant path;
an evaporator in the refrigerant path and disposed in a second air flow path so that air in the second air flow path transfers heat to refrigerant moving through the evaporator;
a compressor in the refrigerant path and configured to move refrigerant in the refrigerant path;
a three-way valve comprising a first connection to a first output line in the refrigerant path from the compressor, a second connection to an input line in the refrigerant path to the first condenser, and a third connection to an input line in the refrigerant path to the second condenser;
a port in the three-way valve, comprising a fourth connection distinct from each of the first connection, the second connection, and the third connection, the fourth connection connected to a bypass refrigerant path connected to an input to the compressor in the refrigerant path where such input is downstream from the evaporator with respect to the refrigerant path;

a second output line in the refrigerant path from the first condenser to the evaporator, the second output line having an expansion valve;

a refrigerant drain line from the second output line to the evaporator, downstream from the expansion valve with respect to the refrigerant path;

a sensor disposed with respect to the second output line so that the sensor outputs a signal corresponding to pressure in the second output line; and a control system in operative communication with
the sensor,
the refrigerant drain line to selectively open and close the refrigerant drain line, and
the three-way valve,
wherein the control system is configured to control opening of the refrigerant drain line responsively to the signal, and
wherein the control system is configured to selectively open the port in the three-way valve in response to pressure in the first output line.

17. The system as in claim 16, wherein the control system comprises
the three-way valve configured so that the three-way valve selectively directs the refrigerant from the first connection to the second connection to the first condenser or to the third connection to the second condenser, and
a valve in the refrigerant drain line, and
wherein the control system is in operative communication with the drain line valve to selectively open and close the drain line valve,
wherein the control system is configured to actuate the three-way valve to at least a first state and a second state, wherein the three-way valve, in the first state, directs the refrigerant from the first connection to the second connection to the first condenser and, in the second state, directs the refrigerant from the first connection to the third connection to the second condenser and not to the second connection to the first condenser, and wherein the control system is configured, upon actuating the three-way valve to the second state, to control the drain line valve to open the drain line, responsive to pressure in the second output line as represented by the signal.

18. The system as in claim 17, wherein a temperature sensor is configured to detect a temperature ambient to the output line, and wherein the control system is configured to convert the ambient temperature into a pressure of refrigerant in the output line.

19. The system as in claim 17, further comprising a fan disposed with respect to the first condenser to move air in the first air flow path across the first condenser, wherein the control system is configured to move the three-way valve from the first state to the second state, and wherein, prior to moving the three-way valve from the first state to the second state, the control system
determines, based on an output from the sensor, whether pressure of refrigerant in the second output line is above a predetermined threshold,
if the pressure of the refrigerant in the second output line is above the predetermined threshold, controls the three-way valve to transition from the first state to the second state, and controls the drain line valve to open the drain line, and
if the pressure of the refrigerant in the second output line is below the predetermined threshold, deactivates the fan while actuating the compressor with the three-way valve in the first state for a period of time prior to controlling the three-way valve to transition from the first state to the second state and controlling the drain line valve to open the drain line.

20. The system as in claim 16, wherein the expansion valve is a single valve.

21. A system for conditioning air and for heating water, comprising:
a refrigerant path;
a first condenser in the refrigerant path and disposed in a first air flow path so that the first condenser transfers heat to air in the first air flow path from refrigerant moving through the first condenser in the refrigerant path;
a second condenser in the refrigerant path and that defines a water flow path so that the second condenser transfers heat to water in the water flow path from refrigerant moving through the second condenser in the refrigerant path;
an evaporator in the refrigerant path and disposed in a second air flow path so that air in the second air flow path transfers heat to refrigerant moving through the evaporator;
a compressor in the refrigerant path and configured to move refrigerant in the refrigerant path;
a three-way valve comprising a first connection to an output line in the refrigerant path from the compressor, a second connection to an input line in the refrigerant path to the first condenser, and a third connection to an input line in the refrigerant path to the second condenser;
a port in the three-way valve, comprising a fourth connection distinct from each of the first connection, the second connection, and the third connection, the fourth connection connected to a bypass refrigerant path connected to an input to the compressor in the refrigerant path where such input is downstream from the evaporator with respect to the refrigerant path;
a temperature sensor disposed with respect to the refrigerant path to detect an air temperature ambient to the refrigerant path; and
a control system in operative communication with the refrigerant path, the three-way valve, and the temperature sensor and configured to
selectively direct refrigerant flow from the first connection, through the second connection to the first condenser or through the third connection to the second condenser and, upon transitioning refrigerant flow from one of the first condenser and the second condenser to the other of the first condenser and the second condenser, controlling refrigerant flow in the refrigerant path in response to ambient temperature detected by the temperature sensor, and
selectively open the port in the three-way valve in response to pressure in the output line in the refrigerant path from the compressor.

* * * * *